(12) United States Patent
Britt et al.

(10) Patent No.: US 10,001,764 B2
(45) Date of Patent: Jun. 19, 2018

(54) ADAPTIVE MULTIPLE INPUT MULTIPLE OUTPUT PID CONTROL SYSTEM FOR INDUSTRIAL TURBINES

(71) Applicant: Woodward, Inc., Fort Collins, CO (US)

(72) Inventors: Tena K. Britt, Loveland, CO (US); Scott David Oceanak, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 308 days.

(21) Appl. No.: 14/932,758

(22) Filed: Nov. 4, 2015

(65) Prior Publication Data

US 2017/0075326 A1    Mar. 16, 2017

Related U.S. Application Data

(60) Provisional application No. 62/217,566, filed on Sep. 11, 2015.

(51) Int. Cl.
*G05B 19/042* (2006.01)
*G05B 13/02* (2006.01)

(52) U.S. Cl.
CPC ......... *G05B 19/042* (2013.01); *G05B 13/024* (2013.01); *G05B 2219/2619* (2013.01)

(58) Field of Classification Search
CPC .......... G05B 19/042; G05B 2219/2619; G05B 13/024; Y02E 10/723

(Continued)

(56) References Cited

U.S. PATENT DOCUMENTS 4,139,887 A    2/1979 Levesque, Jr.
5,357,421 A    10/1994 Tautz et al.
(Continued)

FOREIGN PATENT DOCUMENTS

CN    102777879 B    4/2014
CN    104216288      12/2014
EP    1312765 A2     5/2003

OTHER PUBLICATIONS

International Search Report and Written Opinion of the International Searching Authority issued in International Application No. PCT/US2016/050541 dated Dec. 9, 2016; 12 pages.
(Continued)

*Primary Examiner* — Chun Cao
(74) *Attorney, Agent, or Firm* — Fish & Richardson P.C.

(57) ABSTRACT

The subject matter of this specification can be embodied in, among other things, a method that includes receiving, at a ratio controller, turbine response values based on first process output value based on a first control parameter and a first process input value, and a second process output value based on a second control parameter and a second process input value, providing the first process input value as a predetermined first constant set point value while varying the second process input value, receiving updated turbine response values, determining at least one third control parameter, providing the third control parameter as the second control parameter, providing the second process input value as a predetermined second constant set point value while varying the first process input value, receiving updated turbine response values, determining at least one fourth control parameter, and providing the fourth control parameter as the first control parameter.

16 Claims, 24 Drawing Sheets

(58) Field of Classification Search
USPC .......................................................... 700/287
See application file for complete search history.

(56) References Cited

U.S. PATENT DOCUMENTS

| | | | |
|---|---|---|---|
| 6,081,751 A | 6/2000 | Luo et al. | |
| 6,282,884 B1 | 9/2001 | Adibhatia | |
| 6,546,295 B1 | 4/2003 | Pyotsiaet et al. | |
| 6,697,767 B2 | 2/2004 | Wang et al. | |
| 6,725,103 B2 | 4/2004 | Shigemasa et al. | |
| 7,024,253 B2 | 4/2006 | Gaikwad et al. | |
| 7,035,695 B2 | 4/2006 | Boiko | |
| 7,093,443 B2* | 8/2006 | McKelvey | F01D 15/10 60/39.281 |
| 7,184,847 B2 | 2/2007 | Sun et al. | |
| 7,272,454 B2 | 9/2007 | Wojsznis et al. | |
| 7,531,911 B2* | 5/2009 | Rivas | H02J 3/1885 290/44 |
| 7,542,810 B2 | 6/2009 | Chandhoke | |
| 7,542,975 B2 | 6/2009 | Rjaibi | |
| 7,738,975 B2 | 6/2010 | Denison et al. | |
| 8,109,722 B2* | 2/2012 | Gamble | F03D 1/0658 290/44 |
| 8,280,533 B2 | 10/2012 | Wojsznis et al. | |
| 8,467,888 B2 | 6/2013 | Gahinet et al. | |
| 9,026,233 B2 | 5/2015 | Gahinet et al. | |
| 9,507,365 B2* | 11/2016 | Britt | G05F 1/67 |
| 2002/0040250 A1 | 4/2002 | Gaikwad et al. | |
| 2011/0004356 A1 | 1/2011 | Garcia | |
| 2011/0133453 A1* | 6/2011 | Merswolke | F03D 7/0276 290/44 |
| 2013/0197672 A1 | 8/2013 | Mitra | |
| 2015/0370277 A1* | 12/2015 | Britt | G05F 1/67 700/287 |

OTHER PUBLICATIONS

Palmor et al., "Automatic Tuning of Decentralized PID Controllers for Tito Processes," Pergamon, Automatica, vol. 31, No. 7, pp. 1001-1010.

Zhang et al., "Simultaneous Gains Tuning in Boiler/Turbine PID-Based Controller Clusters Using Iterative Feedback Tuning Methodology," Science Direct, ISA Transactions 51, published in 2012, pp. 609-621.

* cited by examiner

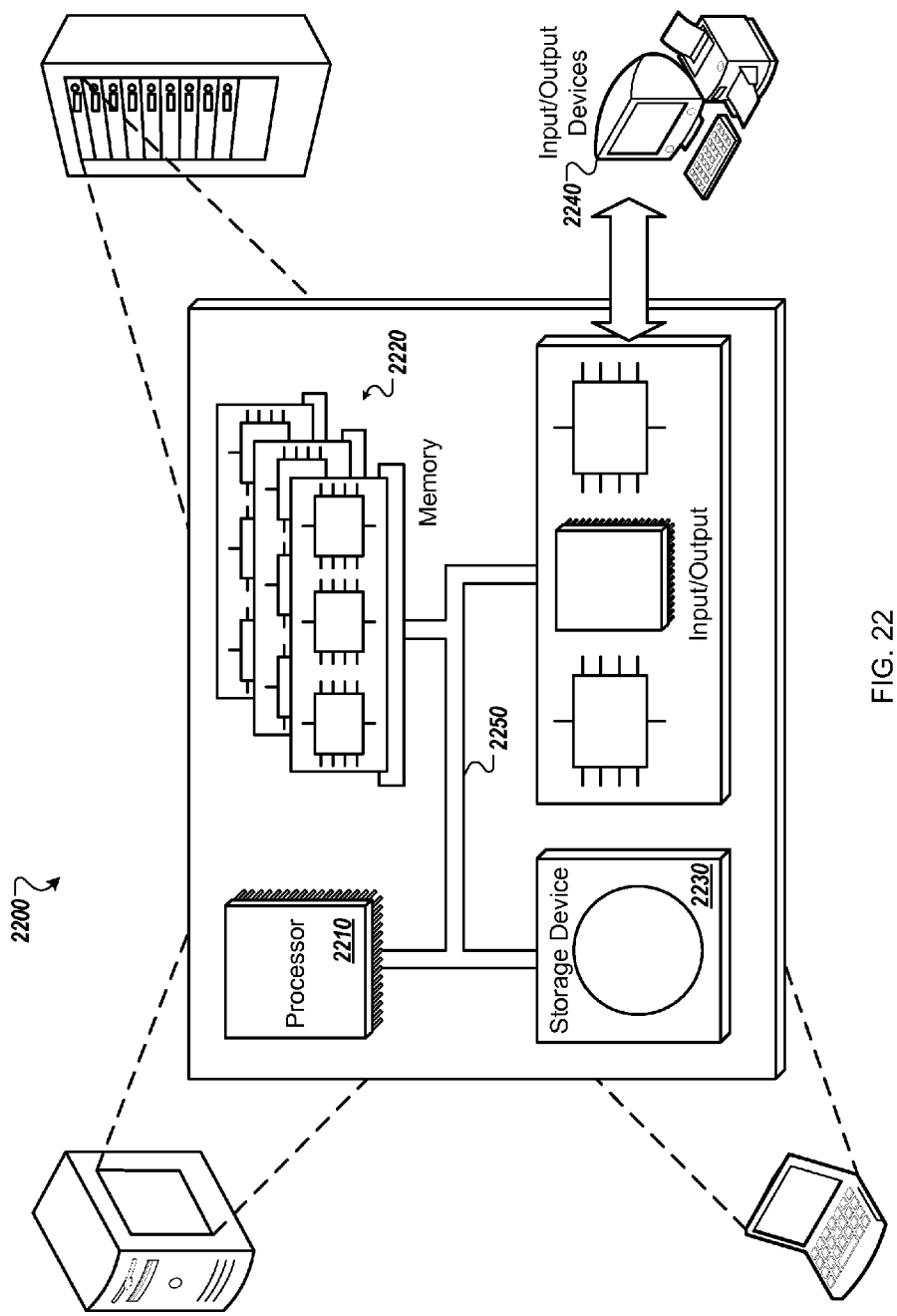

ADAPTIVE MULTIPLE INPUT MULTIPLE OUTPUT PID CONTROL SYSTEM FOR INDUSTRIAL TURBINES

CROSS-REFERENCE TO RELATED APPLICATIONS

This application claims the benefit of priority to U.S. Provisional Application Ser. No. 62/217,566, filed on Sep. 11, 2015, the contents of which are hereby incorporated by reference.

TECHNICAL FIELD

This specification relates to controlling industrial turbines.

BACKGROUND

A turbine is a rotary mechanical device that converts energy from a fluid flow to work, such as by providing thrust or rotary mechanical power. A turbine is a turbomachine with at least one moving part called a rotor assembly, which is a shaft or drum onto which blades are attached. Moving fluid acts on the blades so that they move and impart rotational energy to the rotor.

A proportional-integral-derivative (PID) controller is a control loop feedback system that is widely used in industrial control systems. A PID controller determines the difference between a measured process variable and a desired set point and calculates an error value. The PID controller adjusts process control outputs to reduce the error value.

Tuning of PID controllers can be a difficult task, especially in applications such as turbine control where multiple, possibly conflicting, performance objectives such as fast transient response and high stability of the turbine output are desired. Tuning of PID controllers can also be difficult when the turbine is unloaded, since unloaded turbines are systems with little damping and high acceleration, which are unusual conditions within the process control industry. In practice, such applications can exceed the skills or training of turbine operations personnel, and PID tuning configurations are thus often adjusted repeatedly through trial-and-error until the system provides an acceptable, but not always optimal, level of performance.

SUMMARY

In general, this document describes controlling industrial turbines.

In a first aspect, a method for operating a turbine includes receiving, at a ratio controller, one or more turbine response values based on a first process output value ($S_{out}$) of a first actuator controller, the first process output value based on a first process input value ($S_{in}$) and at least one first control parameter selected from a group including a proportional gain value, an integral gain value, and a derivative gain value, wherein the first actuator controller includes a first parameter controller, and a second process output value ($P_{out}$) of a second actuator controller, the second process output value based on a second process input value ($P_{in}$) and at least one second control parameter selected from the group, wherein the second actuator controller includes a second parameter controller. The method also includes providing, by the ratio controller and to the first actuator controller, the first process input value as a predetermined first constant set point value, varying, by the ratio controller and to the second actuator controller, the second process input value to a plurality of predetermined first set point values, receiving, by the second parameter controller and for one or more of the first set point values, one or more first updated turbine response values as the turbine response values, determining, by the second parameter controller, at least one third control parameter selected from the group based on the turbine response values, providing, by the second parameter controller and to the second actuator controller, the third control parameter as the second control parameter, providing, by the ratio controller and to the second actuator controller, the second process input value as a predetermined second constant set point value, varying, by the ratio controller and to the first actuator controller, the first process input value to a plurality of predetermined second set point values, receiving, by the first parameter controller and for one or more of the second set point values, one or more second updated turbine response values as the turbine response values, determining, by the first parameter controller, at least one fourth control parameter selected from the group based on the turbine response values, and providing, by the first parameter controller and to the first actuator controller, the fourth control parameter as the first control parameter.

Various implementations can include some, all, or none of the following features. The method can include controlling, by the first parameter controller and the second parameter controller, the turbine based on the first process output value and the second process output value. The method can include determining a first control output value (HP) based on the first process output value ($S_{out}$), the second process output value ($P_{out}$), and one or more ratio parameters ($K_x$), determining a second control output value (LP) based on the first process output value ($S_{out}$), the second process output value ($P_{out}$), and the ratio parameters, and controlling, by the ratio controller, the turbine based on the first control output value and the second control output value. The one or more ratio parameters ($K_x$) can include a collection of ratio parameters $K_1$, $K_2$, $K_3$, $K_4$, $K_5$, and $K_6$, the first control output (HP) can be given by the equation $HP=K_1 S_{out}+K_2 P_{out}+K_3$, and the second control output (LP) can be given by the equation $LP=K_4 S_{out}+K_5 P_{out}+K_6$. The first parameter controller can control a first component of the turbine effecting the turbine response values, and the second parameter controller controls a second component of the turbine effecting the turbine response values.

In a second aspect, a turbine controller includes an input port, an output port, a ratio controller, memory storing instructions that are executable, and one or more processing devices to execute the instructions to perform operations that include receiving, at the ratio controller, one or more turbine response values based on a first process output value ($S_{out}$) of a first actuator controller, the first process output value based on a first process input value ($S_{in}$) and at least one first control parameter selected from a group including a proportional gain value, an integral gain value, and a derivative gain value, wherein the first actuator controller includes a first parameter controller, and a second process output value ($P_{out}$) of a second actuator controller, the second process output value based on a second process input value ($P_{in}$) and at least one second control parameter selected from the group, wherein the second actuator controller includes a second parameter controller. The operations also include providing, by the ratio controller and to the first actuator controller, the first process input value as a predetermined first constant set point value, varying, by the ratio controller and to the second actuator controller, the second process input value to a plurality of predetermined first set point values, receiving, by the second parameter controller and for one or more of the first set point values, one or more first updated turbine response values as the turbine response values, determining, by the second parameter controller, at least one third control parameter selected from the group based on the turbine response values, providing, by the second parameter controller and to the second actuator controller, the third control parameter as the second control parameter, providing, by the ratio controller and to the second actuator controller, the second process input value as a predetermined second constant set point value, varying, by the ratio controller and to the first actuator controller, the first process input value to a plurality of predetermined second set point values, receiving, by the first parameter controller and for one or more of the second set point values, one or more second updated turbine response values as the turbine response values, determining, by the first parameter controller, at least one fourth control parameter selected from the group based on the turbine response values, and providing, by the first parameter controller and to the first actuator controller, the fourth control parameter as the first control parameter.

Various embodiments can include some, all, or none of the following features. The operations can include controlling, by the first parameter controller and the second parameter controller, the turbine based on the first process output value and the second process output value. The operations can include determining a first control output value (HP) based on the first process output value ($S_{out}$), the second process output value ($P_{out}$), and one or more ratio parameters ($K_x$), determining a second control output value (LP) based on the first process output value ($S_{out}$), the second process output value ($P_{out}$), and the ratio parameters, and controlling, by the ratio controller, the turbine based on the first control output value and the second control output value. The one or more ratio parameters ($K_x$) can include a collection of ratio parameters $K_1$, $K_2$, $K_3$, $K_4$, $K_5$, and $K_6$, the first control output (HP) can be given by the equation $HP=K_1 S_{out} + K_2 P_{out} + K_3$, and the second control output (LP) can be given by the equation $LP=K_4 S_{out} + K_5 P_{out} + K_6$. The first parameter controller can control a first component of the turbine effecting the turbine response values, and the second parameter controller can control a second component of the turbine effecting the turbine response values.

In a third aspect, a turbine system includes a first process controller configured to perform a control algorithm based on at least one first control parameter selected from a group including a proportional gain value, an integral gain value, and a derivative value, a second process controller configured to perform a control algorithm based on at least one second control parameter selected from a group including a proportional gain value, an integral gain value, and a derivative value, a ratio controller configured to perform a parameter adjustment algorithm, a turbine having assembled thereto a turbine output sensor in communication with the first process controller, the second process controller, and the ratio controller, wherein the parameter adjustment algorithm is configured to perform operations that include receiving, at the ratio controller, one or more turbine response values based on a first process output value ($S_{out}$) of a first actuator controller, the first process output value based on a first process input value ($S_{in}$) and at least one first control parameter selected from a group including a proportional gain value, an integral gain value, and a derivative gain value, wherein the first actuator controller includes a first parameter controller and a second process output value ($P_{out}$) of a second actuator controller, the second process output value based on a second process input value ($P_{in}$) and at least one second control parameter selected from the group, wherein the second actuator controller includes a second parameter controller. The operations also include providing, by the ratio controller and to the first actuator controller, the first process input value as a predetermined first constant set point value, varying, by the ratio controller and to the second actuator controller, the second process input value to a plurality of predetermined first set point values, receiving, by the second parameter controller and for one or more of the first set point values, one or more first updated turbine response values as the turbine response values, determining, by the second parameter controller, at least one third control parameter selected from the group based on the turbine response values, providing, by the second parameter controller and to the second actuator controller, the third control parameter as the second control parameter, providing, by the ratio controller and to the second actuator controller, the second process input value as a predetermined second constant set point value, varying, by the ratio controller and to the first actuator controller, the first process input value to a plurality of predetermined second set point values, receiving, by the first parameter controller and for one or more of the second set point values, one or more second updated turbine response values as the turbine response values, determining, by the first parameter controller, at least one fourth control parameter selected from the group based on the turbine response values, and providing, by the first parameter controller and to the first actuator controller, the fourth control parameter as the first control parameter.

Various embodiments can include some, all, or none of the following features. The operations can also include controlling, by the first parameter controller and the second parameter controller, the turbine based on the first process output value and the second process output value. The operations can include determining, by a ratio controller, at one or more ratio parameters ($K_x$), determining a first control output value (HP) based on the first process output value ($S_{out}$), the second process output value ($P_{out}$), and the ratio parameters, determining a second control output value (LP) based on the first process output value ($S_{out}$), the second process output value ($P_{out}$), and the ratio parameters, and controlling, by the ratio controller, the turbine based on the first control output value and the second control output value. The one or more ratio parameters ($K_x$) can include a collection of ratio parameters $K_1$, $K_2$, $K_3$, $K_4$, $K_5$, and $K_6$, the first control output (HP) can be given by the equation $HP=K_1 S_{out}+K_2 P_{out}+K_3$, and the second control output (LP) can be given by the equation $LP=K_4 S_{out}+K_5 P_{out}+K_6$. The first parameter controller can control a first component of the turbine effecting the turbine response values, and the second parameter controller can control a second component of the turbine effecting the turbine response values.

In a fourth aspect, a computer readable medium stores instructions that, when executed by one or more processors, cause the one or more processors to perform operations including receiving, at a ratio controller, one or more turbine response values based on a first process output value ($S_{out}$) of a first actuator controller, the first process output value based on a first process input value ($S_{in}$) and at least one first control parameter selected from a group including a proportional gain value, an integral gain value, and a derivative gain value, wherein the first actuator controller includes a first parameter controller and a second process output value ($P_{out}$) of a second actuator controller, the second process output value based on a second process input value ($P_{in}$) and at least one second control parameter selected from the group, wherein the second actuator controller includes a second parameter controller. The operations also include providing, by the ratio controller and to the first actuator controller, the first process input value as a predetermined first constant set point value, varying, by the ratio controller and to the second actuator controller, the second process input value to a plurality of predetermined first set point values, receiving, by the second parameter controller and for one or more of the first set point values, one or more first updated turbine response values as the turbine response values, determining, by the second parameter controller, at least one third control parameter selected from the group based on the turbine response values, providing, by the second parameter controller and to the second actuator controller, the third control parameter as the second control parameter, providing, by the ratio controller and to the second actuator controller, the second process input value as a predetermined second constant set point value, varying, by the ratio controller and to the first actuator controller, the first process input value to a plurality of predetermined second set point values, receiving, by the first parameter controller and for one or more of the second set point values, one or more second updated turbine response values as the turbine response values, determining, by the first parameter controller, at least one fourth control parameter selected from the group based on the turbine response values, and providing, by the first parameter controller and to the first actuator controller, the fourth control parameter as the first control parameter.

Various embodiments can include some, all, or none of the following features. The operations can also include controlling, by the first parameter controller and the second parameter controller, the turbine based on the first process output value and the second process output value. The operations can include determining, by a ratio controller, at one or more ratio parameters ($K_x$), determining a first control output value (HP) based on the first process output value ($S_{out}$), the second process output value ($P_{out}$), and the ratio parameters, determining a second control output value (LP) based on the first process output value ($S_{out}$), the second process output value ($P_{out}$), and the ratio parameters, and controlling, by the ratio controller, the turbine based on the first control output value and the second control output value. The one or more ratio parameters ($K_x$) can include a collection of ratio parameters $K_1$, $K_2$, $K_3$, $K_4$, $K_5$, and $K_6$, the first control output (HP) can be given by the equation $HP=K_1 S_{out}+K_2 P_{out}+K_3$, and the second control output (LP) can be given by the equation $LP=K_4 S_{out}+K_5 P_{out}+K_6$. The first parameter controller can control a first component of the turbine effecting the turbine response values, and the second parameter controller can control a second component of the turbine effecting the turbine response values.

The systems and techniques described herein may provide one or more of the following advantages. First, a system can provide for automated adjustment of proportional, integral, and derivative gain parameters of multiple input, multiple output (MIMO) process controllers to achieve a predetermined operation of a turbine. Second, the system can provide MIMO speed and pressure control of a turbine. Third, the system can provide MIMO load and pressure control of a gas or steam turbine, utilizing speed droop. Fourth, the system can provide MIMO load control of a gas or steam turbine, utilizing load droop. Fifth, the system can provide MIMO inlet/exhaust and pressure control of a steam turbine pulling a vacuum. Sixth, the system can provide MIMO extraction control of a steam turbine.

The details of one or more implementations are set forth in the accompanying drawings and the description below. Other features and advantages will be apparent from the description and drawings, and from the claims.

DESCRIPTION OF DRAWINGS

FIG. 22 is a schematic diagram of an example of a generic computer system.

DETAILED DESCRIPTION

This document describes systems and techniques for multiple input, multiple output (MIMO) control of industrial turbines. Industrial turbines can be controlled using proportional (P), proportional-integral (PI), and proportional-integral-derivative (PID) controllers. Tuning P, PI, and PID controllers, however, can be a challenge. For example, because industrial turbines can present demanding control challenges, and/or because the dynamic behavior of industrial turbines may not be an obvious or intuitive subject for some turbine operators.

Figure 1:
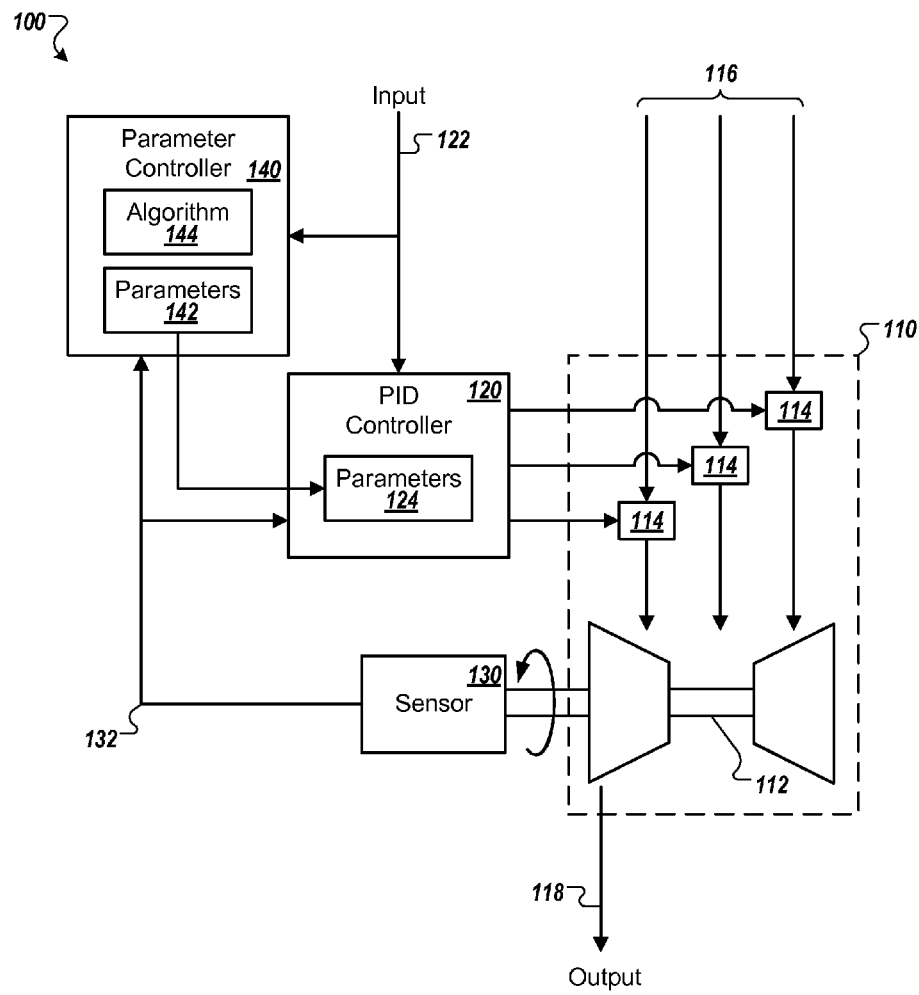
FIG. 1 is a schematic diagram that shows an example of an industrial turbine control system.

FIG. 1 is a schematic diagram that shows an example of an industrial turbine control system 100. A turbine assembly 110 includes a turbine 112, and a collection of one or more controllable inputs 114 for controlling the flow of a collection of one or more fluid or steam supplies 116 to the turbine 112. By controllably adjusting the controllable inputs 114 to control the flows of the steam/fluid supplies 116 to the turbine 112, the rotational speed, load, acceleration, deceleration, and other performance parameters of the turbine 112 can be controllably adjusted.

In some embodiments, the turbine 112 can be a gas turbine or other form of combustion-driven turbine. In such embodiments, the controllable inputs 114 can include pumps, valves, injectors, and combinations of these and other devices for controlling the flows of the fluid supplies 116 such as gasses (e.g., natural gas, hydrogen, oxygen, propane, methane, air) and/or liquids (e.g., fuel, water) to the turbine 112. In some embodiments, the turbine 112 can be a steam turbine. In such embodiments, the controllable inputs 114 can include pumps, valves, injectors, and combinations of these and other devices for controlling the flow of the fluid supply 116, in the form of steam, to the turbine 112.

In the example system shown in FIG. 1, the controllable inputs 114 are adjusted by a proportional-integral-derivative (PID) controller 120. The PID controller 120 adjusts the controllable inputs 114 based on an input parameter 122 (e.g., desired turbine speed), a feedback signal 132 provided by a sensor 130 configured to sense an output 118 of the turbine 112, and a collection of control parameters 124 in a closed-loop feedback control system. In some embodiments, the sensor 130 can be a speed sensor configured to sense the rotational speed of the turbine 112, and provide a speed signal as the feedback signal 132 to the PID controller 120. In some embodiments, the sensor 130 can be a temperature, pressure, vibration, or any other appropriate sensor that can be used to sense a parameter of the turbine assembly 110 and provide the feedback signal 132 in response to the sensed parameter. In some embodiments, the PID controller 120 can be a P controller or a PI controller instead, or the PID controller 120 can be configured as a PI or P controller (e.g., by setting D and/or I gains to zero).

The performance of the turbine assembly 110 is evaluated as a comparison between how rapidly and/or accurately the feedback signal 132 tracks the input parameter 122. For example, the input parameter 122 can be a desired speed setting, and the control parameters 124 can affect how closely the speed of the turbine 112 matches a desired steady-state speed, and/or the control parameters 124 can affect how closely the speed of the turbine 112 is able to change to meet a newly established desired speed within a predetermined amount of time (e.g., an overdamped response) and within a predetermined amount of speed overshoot (e.g., an underdamped response). Examples of overdamped and underdamped responses are discussed further in connection with the descriptions of FIGS. 7 and 8.

In the example system shown in FIG. 1, the input parameter 122 and the feedback signal 132 are also provided to a parameter controller 140. The parameter controller 140 compares the input parameter 122 to the feedback signal 132 to determine a set of control parameters 142. The parameter controller 140 can also generate a disturbance parameter and provide it as the input parameter 122 to the PID controller 120, or control the output of the PID directly, and analyze the response of the turbine 112 through the feedback signal 132. For example, the parameter controller 140 can change a desired speed from a first desired speed to a second desired speed as a step function, and can monitor the output of a speed sensor to analyze how accurately and quickly the turbine assembly 110 responds. The parameter controller 140 can also adjust the actuator directly, and analyze the system.

By comparing the input parameter 122 to the feedback signal 132, the parameter controller 140 can execute a parameter adjustment algorithm 144 to determine a set of control parameters 142. The parameter controller 140 provides the control parameters 142 to the PID controller 120 for use as the control parameters 124, for controlling the turbine assembly 110.

In some embodiments, the system 100 can provide load control of a gas or steam turbine utilizing speed droop. In some embodiments, the system 100 can provide load control of a gas or steam turbine utilizing load droop. For example, droop control can allow individual generators to share system load changes in proportion to their maximum output rating. For example, in electricity generation, droop speed control can be a primary instantaneous system using net frequency deviations to stably distribute load changes over multiple turbine-driven generators. In some embodiments, pressure control, temperature control, flow control, voltage control, current control, kw control, or combinations of these and/or other appropriate control types can be utilized to control a turbine.

Figure 2:
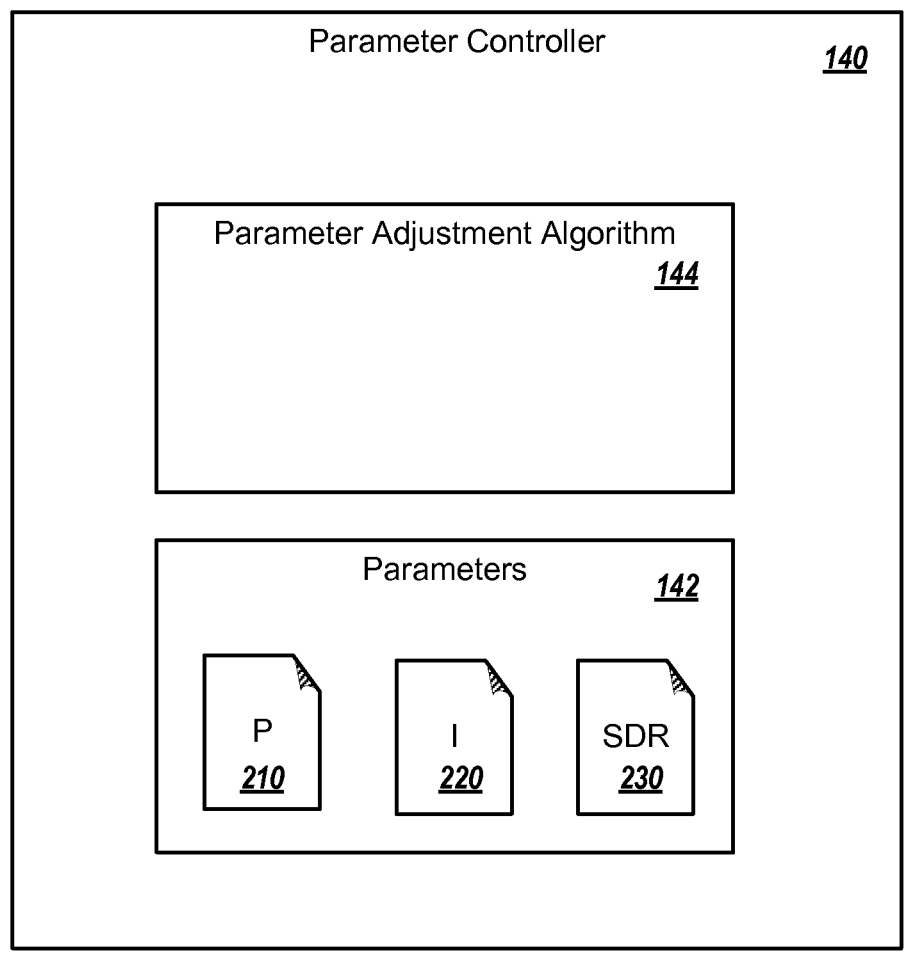
FIG. 2 is a block diagram that shows an example of a parameter controller.

FIG. 2 is a block diagram that shows an example of the parameter controller 140 of FIG. 1. The parameter controller 140 includes the control parameters 142 and the parameter adjustment algorithm 144. Included among the control parameters 142 are a proportional (P) gain parameter 210, an integral (I) gain parameter 220, and a derivative gain parameter (D). For user input purposes, rather than derivative, an input for a speed derivative ratio (SDR) gain parameter 230, may be provided. The SDR parameter is converted to the derivative parameter by the parameter controller 140 and/or the PID controller 120. A generic form of the parallel PID controller transfer function used by the PID controller 120 is given by the equation:

$$H(s) = P\left(1 + \frac{I}{s}\right)(Ds + 1)$$

Rather than exposing the derivative term (D) to the user, the PID controller 120 uses the form shown above to allow the user to adjust the Speed Derivative Ratio, or SDR. In some implementations, the SDR parameter can simplify the task of turbine configuration, while leaving the fundamental PID structure substantially unchanged, and allows the PID algorithm to use values for the P, I, and D gain parameters.

The SDR parameter 230 is a combination of I and D. In some implementations, use of the SDR parameter 230 can make tuning of the PID controller 120 easier for turbine operators or other users. The user selects the SDR value to indicate whether input or feedback dominant behavior is desired. For examples in which the value of the SDR parameter 230 is greater than 1, but less than 100, the system is considered as being "feedback dominant", and the equation representing the output of the PID controller 120 is:

$$\text{Out} = \frac{1}{\left(\frac{1}{I}\right)s + 1}\text{Feedback} + \frac{\left(\frac{1}{SDR \cdot I}\right)s + 1}{\left(\frac{0.2}{SDR \cdot I}\right)s + 1} P \cdot \text{error},$$

and $$D = 1/(SDR * I)$$

In the foregoing equation, "error" represents the error between the set point and the process inputs, and "Out" represents the output of the PID function, which is typically the demand to the actuator.

In feedback dominant mode, the I term is implemented in the integrator feedback, and the control will be less sensitive to input noise. In some implementations, this mode can be useful for parameters which are mostly influenced by fuel demand, because the PID controller 120 can limit the fuel demand of other modes of control even if the set point of the PID controller 120 has not been exceeded. In some implementations, temperature controls can use this mode because temperature feedback is generally not fast enough to prevent an over-temperature condition even when extra derivative gain is provided in the input.

For examples in which the value of the SDR parameter 230 is equal or less than 1, but greater than 0.01, the system is considered as being "input dominant", and the equation representing the output of the PID controller 120 is:

$$\text{Out} = \frac{1}{\left(\frac{SDR}{I}\right)s + 1} \text{Feedback} + \frac{\left(\frac{1}{I}\right)s + 1}{\left(\frac{0.2 \cdot SDR}{I}\right)s + 1} SDP \cdot P \cdot \text{error},$$

and $$D = SDR / I$$

In input dominant mode, the D term is implemented in the integrator feedback, and the control will be more sensitive to its input and less sensitive to its feedback. This configuration causes the PID controller 120 to take corrective action before reaching the set point. In some implementations, this mode can be used when the parameter being controlled is influenced by an external disturbance. The "input dominant" mode responds well to external disturbances, but has an increased sensitivity to noise coming in with the controlled parameter. Again, in the present example, "error" represents set point feedback error, and "Out" represents the output of the PID function.

For examples in which the value of the SDR parameter 230 is less than or equal to 0.01 or greater than or equal to 100, the equation is used, with D set to 0. In both of these cases, the PID controller 120 operates as a PI controller, rather than a PID controller. The parameter controller 140 uses the parameter adjustment algorithm 144 to determine the P and I, or P, I, and SDR values, and provides them to the PID controller 120 for use as the control parameters 124.

While the transfer function for the input dominant mode and the feedback dominant mode is substantially the same, the difference between the two modes will be exhibited when the controlled system comes into control from an out of control situation. The selection of the "input dominant" or "feedback dominant" mode is selected by the user, and has substantially no effect on a single PID control, has substantially no effect on a multiple PID control in which one PID is in control, and has substantially no effect on the parameter controller functionality. For the purposes of the examples discussed here, it does not matter whether the system is input or feedback dominant. The two equations above are the same, except when the PID controller 120 is coming into or out of control. As a result, the equation below can be used for further discussions, without loss of accuracy.

$$H(s) = P\left(1 + \frac{1}{s}\right)(Ds + 1)$$

For the purpose of the following discussion, it does matter if the control is a PI or PID controller, as the gains are calculated differently. For a PID control, P, I, and D are calculated. For a PI control, D is set to 0, and P is lowered accordingly. For a P control, I and D are set to 0 and P is lowered further. In some implementations, nominal values for P, I, and D may vary from system to system. For example, P may vary inversely with the input variable scaling and range, and I and D may vary with the response of the system being controlled. As discussed previously, D is a function of SDR. P, I, and SDR vary with the desired response by the user. For example, some control loops may require very fast response, while other control loops may not tolerate overshoot well and should be configured to provide more margin.

Figure 3:
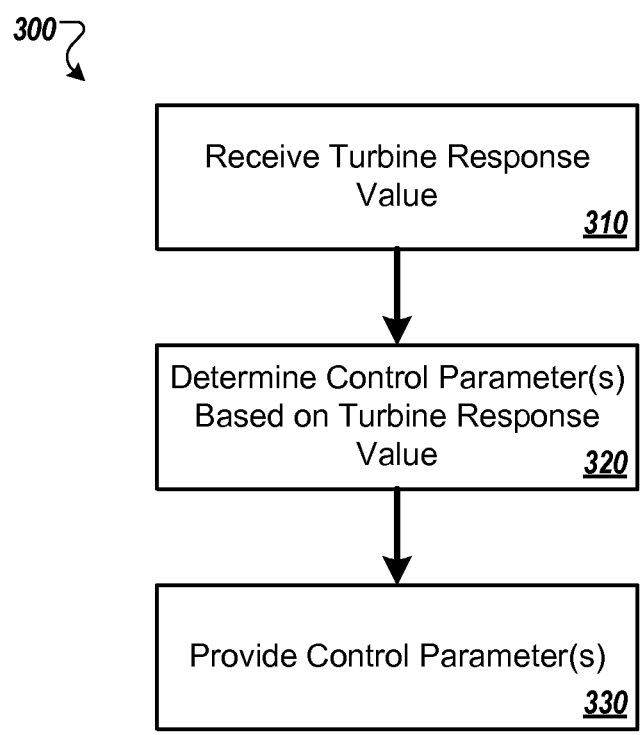
FIG. 3 is flow chart that shows an example of a process for determining PID control parameters.

FIG. 3 is flow chart that shows an example of a process 300 for determining PID control parameters. In some implementations, process 300 can be performed by the parameter controller 140 of the example system 100 shown in FIG. 1.

At 310 a turbine response value is received. The turbine response value is based on at least one first control parameter and an input value. For example, the feedback signal 132 is received at the parameter controller 140. The feedback signal 132 provides information about an output of the turbine assembly 110, such as turbine speed, turbine load, outlet temperature, flow, current, voltage, inlet pressure, outlet pressure, extraction pressure, or vibration that is generated by the turbine 112, which is controlled by the PID controller 120 based on the input parameter 122 and the control parameters 124.

At 320, at least one second control parameter is determined based on the turbine response value and a parameter adjustment algorithm. For example, the parameter controller 140 can execute the parameter adjustment algorithm 144 to determine the P gain parameter 210, the I gain parameter 220, and/or the SDR parameter 230.

The parameter adjustment algorithm may have five inputs or handles that the user can adjust. The user can adjust the desired speed of the response by configuring a "FAST_SLOW" input parameter. The user can select P, PI, or PID control, by configuring a "P_PI_PID input" parameter. The user can select the desired allowable actuator movement limit by configuring an "OUT_MV_LMT" input parameter. The user can also select the desired allowable process movement by configuring a "PRC_MV_LMT" input parameter, and the allowable droop process movement by configuring a "DRP_MV_LMT" input parameter.

In the present example, the parameter adjustment algorithm operates substantially synchronously with the PID controller 120, at substantially the same recursion rate as the PID controller 120, and with inputs and outputs which are substantially synchronized to the PID controller 120. In some implementations, this concept could also be implemented in systems with different recursion rates among the PID controller, the parameter adjustment algorithm, and the system inputs and outputs. When enabled, the parameter adjustment algorithm initially controls the actuator directly, and observes the turbine response. The actuator moves up and down, within the OUT_MV_LMT and PRC_MV_LMT parameters, based on the process response. When the process moves up, the actuator moves down, and vice versa.

From the process response, the system gain, the system response frequency, and the relative system dead time are observed.

The system gain is a ratio of the amount of process movement change to the amount of actuator movement change. The system gain can be calculated by measuring the amplitude of the actuator movement, measuring the amplitude of the process movement, and dividing them. By definition of a closed loop, the P value should be a fraction of the inverse of the system gain. If the P value, multiplied by the system gain, is greater than 1 then the loop will be unstable because the loop gain will be greater than 1. The amount of process movement and frequency of process movement is varied during the test, and the system gain is calculated for each variation. This relative system gain is the ratio of the system gain for high frequency/low amplitude changes, to the system gain for low frequency/high amplitude changes.

The system response frequency is the frequency at which the system responds to actuator changes. The system frequency can be calculated by measuring the period of the turbine response, and inverting it. By definition of a closed loop, the I value is generally configured to be a fraction of the system response frequency, and the D value is generally configured to be a fraction of the inverse of the system response frequency. If the I value exceeds the system response frequency, or the D value exceeds the inverse of the system response frequency, the system will be unstable, because the control will request faster movement than the turbine system can provide.

The system dead time is the elapsed time between an actuator movement change from steady state until the beginning of a process movement change. The relative system dead time is the ratio of the system dead time, to the system response frequency.

The new P, I, and D values are calculated based on the system gain, relative system gain, system response frequency and relative system dead time parameters, and on the FAST_SLOW input, as well as the P_PI_PID input. There are many tuning algorithms which use system gain and system response as inputs, such as the Ziegler-Nichols algorithm. There are also algorithms which use system gain, system response, and system dead time as inputs, such as the Cohen-Coon algorithm. Both of these algorithms are referenced in multiple publications, and in various implementations, each algorithm can have its own comparative advantages and disadvantages. For example, the Ziegler-Nichols and related algorithms may be selected for use in systems with minimal dead time, but may not always work well for systems with significant dead time, and can be too aggressive for some systems. In another example, the Cohen-Coon and similar algorithms may be selected for use in systems with significant dead times, but these algorithms may not always work well for systems which are modeled by integrators, such as unloaded turbines. In some implementations, the Ziegler-Nichols algorithm, the Cohen-Coon algorithm, or a combination of these and any other appropriate algorithm for tuning P, I, and/or D gain values may be used by the parameter controller 140.

The P value, which is calculated by the parameter controller 140, is a function of the system gain, relative system gain, the relative system dead time, the FAST_SLOW input, and whether the system is configured as a P, PI, or PID control (e.g., the P_PI_PID input). The P value is inversely proportional to the system gain. The calculated P value is modified, based on the relative system gain, relative system dead time and on whether the control is configured to be a P, PI, or PID control. High relative system gains and high relative system dead times would decrease the P value. In implementations in which long relative dead times are expected, an algorithm similar to the Cohen-Coon algorithm may be used, while other systems may use an algorithm similar to the Ziegler-Nichols algorithm. The FAST_SLOW input provides the user with a gain adjustment for the P value. In various implementations, different equations can be used for a PID control configuration, a PI control configuration, and a P control configuration. PID control configurations will have relatively higher P and I terms than a PI control configuration, which will have a relatively higher P term than a proportional (P) control configuration.

The I and the D values, which are calculated by the parameter controller 140, are a function of the measured system response frequency, the relative system gain, the relative system dead time, the FAST_SLOW input, and on whether the system is configured as a P, PI, or PID control (e.g., the P_PI_PID input). The calculated I and D values are modified, based on the relative system gain, relative system dead time, the FAST_SLOW input, and on whether the control is configured to be a P, PI, or PID control. High relative system gains and high relative system dead times would increase the calculated I value and decrease the calculated D value. In some implementations in which relatively long dead times are expected, an algorithm similar to the Cohen-Coon algorithm can be used, while other systems can use an algorithm similar to the Ziegler-Nichols algorithm. As is typically seen in published literature, a PID control configuration will have relatively higher gain values for the P and I terms than are used a PI control configuration.

When the PID controller 120 is configured with a PI control configuration, the recommended D is set to 0, and the PID controller 120 is configured as a PI control. When the system is PID as a proportional control, the recommended D and I are set to 0, and the PID controller 120 is configured as a proportional control. As seen in the parallel PID equation above, the effect of I and D are also a function of P.

After calculating the new values, the parameter adjustment algorithm 144 performs a step response of the PID controller 120, using newly calculated P, I, and D values, and monitors the response. The P, I, and D values are modified as necessary, based on the system gain, relative system gain, system response, and relative system dead time, as described above.

At 330 the at least one second control parameter is provided. For example, the parameter controller 140 can provide the collection of control parameters 142 to the PID controller 120 for use as the collection of control parameters 124.

Figure 4:
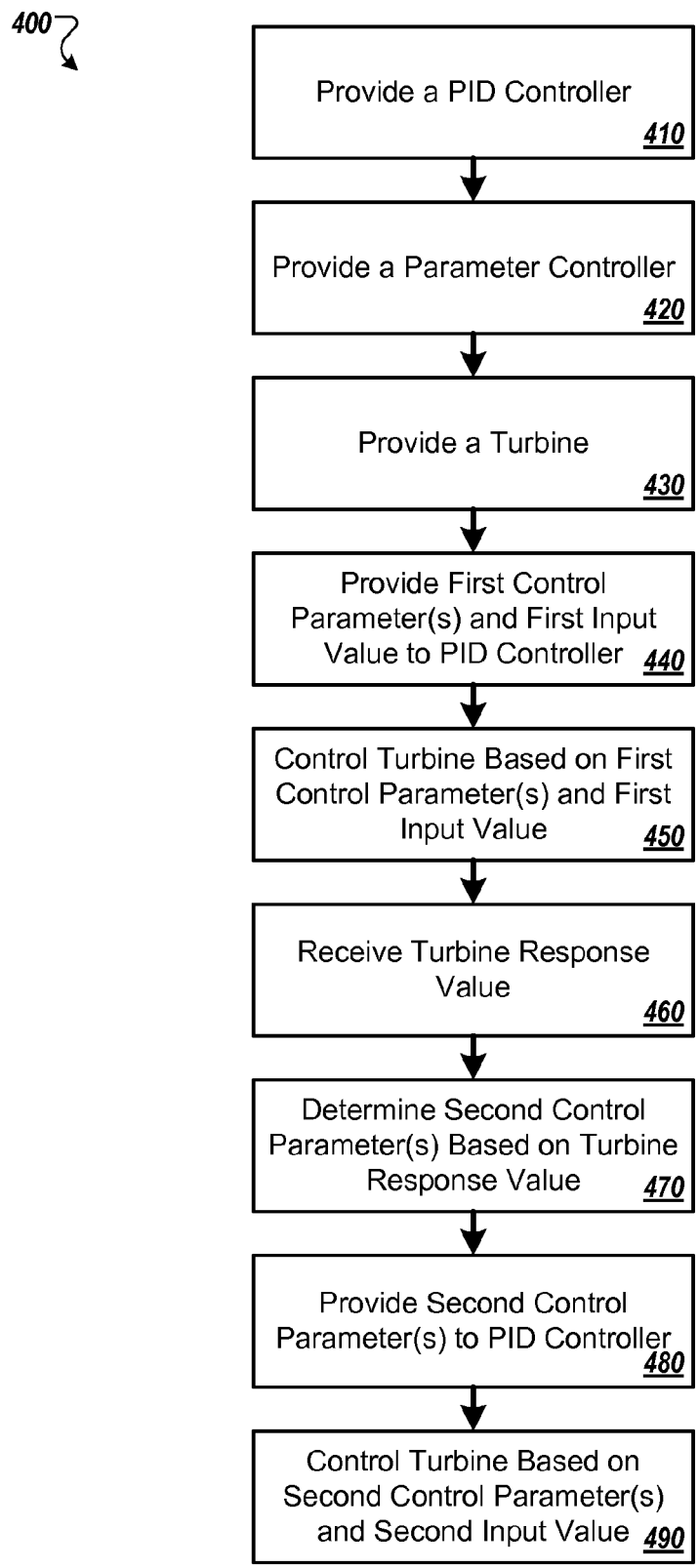
FIG. 4 is flow chart that shows an example of a process for controlling industrial turbines.

FIG. 4 is flow chart that shows an example of a process 400 for controlling industrial turbines. For example the process 400 can be performed by the example system 100 shown in FIG. 1.

At 410 a PID controller is provided. The PID controller is configured to perform a control algorithm based on at least one first control parameter. For example, the PID controller 120 is provided, and the PID controller 120 performs a control algorithm to control the turbine assembly 110. In some implementations, the first input value can be a turbine speed, an outlet temperature, an inlet pressure, and/or and extraction pressure.

At 420, a parameter controller is provided. The parameter controller is configured to perform a parameter adjustment algorithm. For example, the parameter controller 140 is configured to perform the parameter adjustment algorithm 144.

At 430 a turbine is provided. The turbine includes a turbine output sensor in communication with the PID controller and the parameter controller. For example, the turbine 112 has the sensor 130 assembled to it.

At 440 at least one first control parameter and a first input value are provided to the PID controller. For example, the input parameter 122 and the collection of parameters 124 are provided to the PID controller 120. In some implementations, the at least one first control parameter can be the P gain parameter 210, the I gain parameter 220, and/or the SDR parameter 230.

At 450 the PID controller controls the turbine based on the at least one first control parameter and the first input value. For example, the PID controller 120 controls the controllable inputs 114, based on the input parameter 122 and the collection of parameters 124, to control the turbine 112.

At 460 the parameter controller receives a turbine response value provided by the turbine output sensor. For example, the parameter controller 140 receives the feedback signal 132. The feedback signal 132 can be processed to determine one or more values that can describe the response of the turbine 112 to the input parameter 122 and the collection of control parameters 124.

At 470, the parameter controller determines at least one second control parameter based on the turbine response value and the parameter adjustment algorithm. For example, the parameter controller 140 determines the collection of control parameters 142. In some implementations, the collection of control parameters 142 can be different from the collection of control parameters 124. In some implementations, the at least one second control parameter can be the P gain parameter 210, the I gain parameter 220, and/or the SDR parameter 230.

At 480, the at least one second control parameter is provided to the PID controller from the parameter controller. For example, the collection of control parameters 142 can be provided to the PID controller 120 for use as the collection of control parameters 124.

At 490 the turbine is controlled by the PID controller based on at least one second control parameter and a second input value. For example, the collection of control parameters 142 can be used by the PID controller 120 as the collection of control parameters 124 for controlling the turbine assembly 110. In some implementations, the second input value can be a turbine speed, an outlet temperature, an inlet pressure, and/or and extraction pressure.

Figure 5:
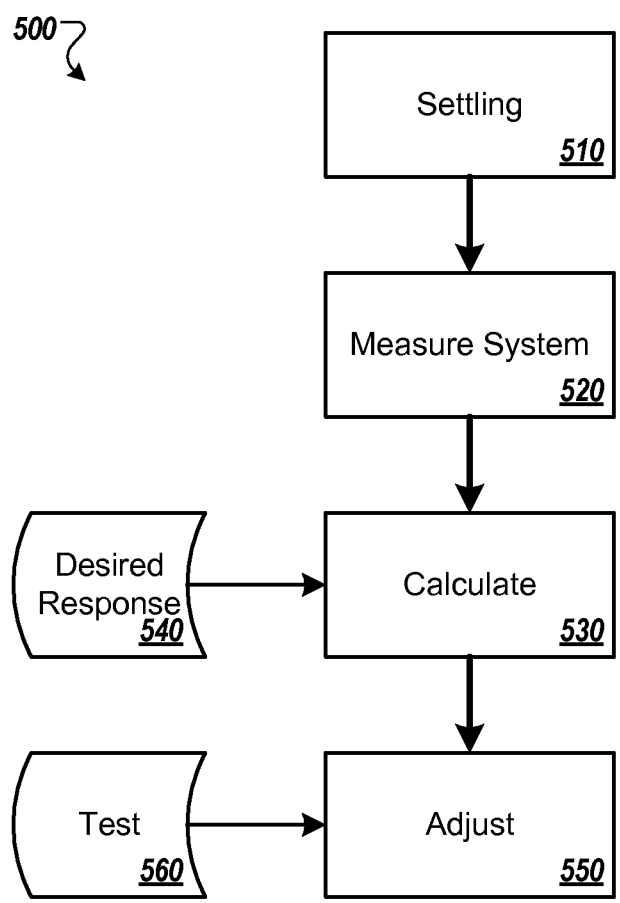
FIG. 5 is flow chart that shows another example of a process for determining PID control parameters.

FIG. 5 is flow chart that shows another example of a process 500 for determining PID control parameters. In some implementations, the process 500 can be performed by the industrial turbine control system 100.

At 510, the system is allowed to settle in to a substantially steady state of operation relative to the input parameter 122. At 520, the output of the system is measured using an algorithm that is configured for the type of turbine in use as the turbine 112. For example, the algorithm may be configured differently for a steam turbine, a liquid fueled turbine (e.g., an aircraft turbine), or a gas fueled turbine (e.g., natural gas turbine). In some implementations, the algorithm may be configured differently for different types of control. For example, the algorithm may be configured differently for speed control, load control, temperature control, or for combinations of these or any other controllable outputs of the turbine 112.

At 530, the parameter adjustment algorithm 144 is performed to calculate the collection of control parameters 142 based on the measured system parameters and a desired response input 540. At 550 the calculated collection of control parameters 142 is used in conjunction with a test input 560 to test the collection of control parameters 142 and trigger a further adjustment of the collection of control parameters 142, if needed.

Figure 6:
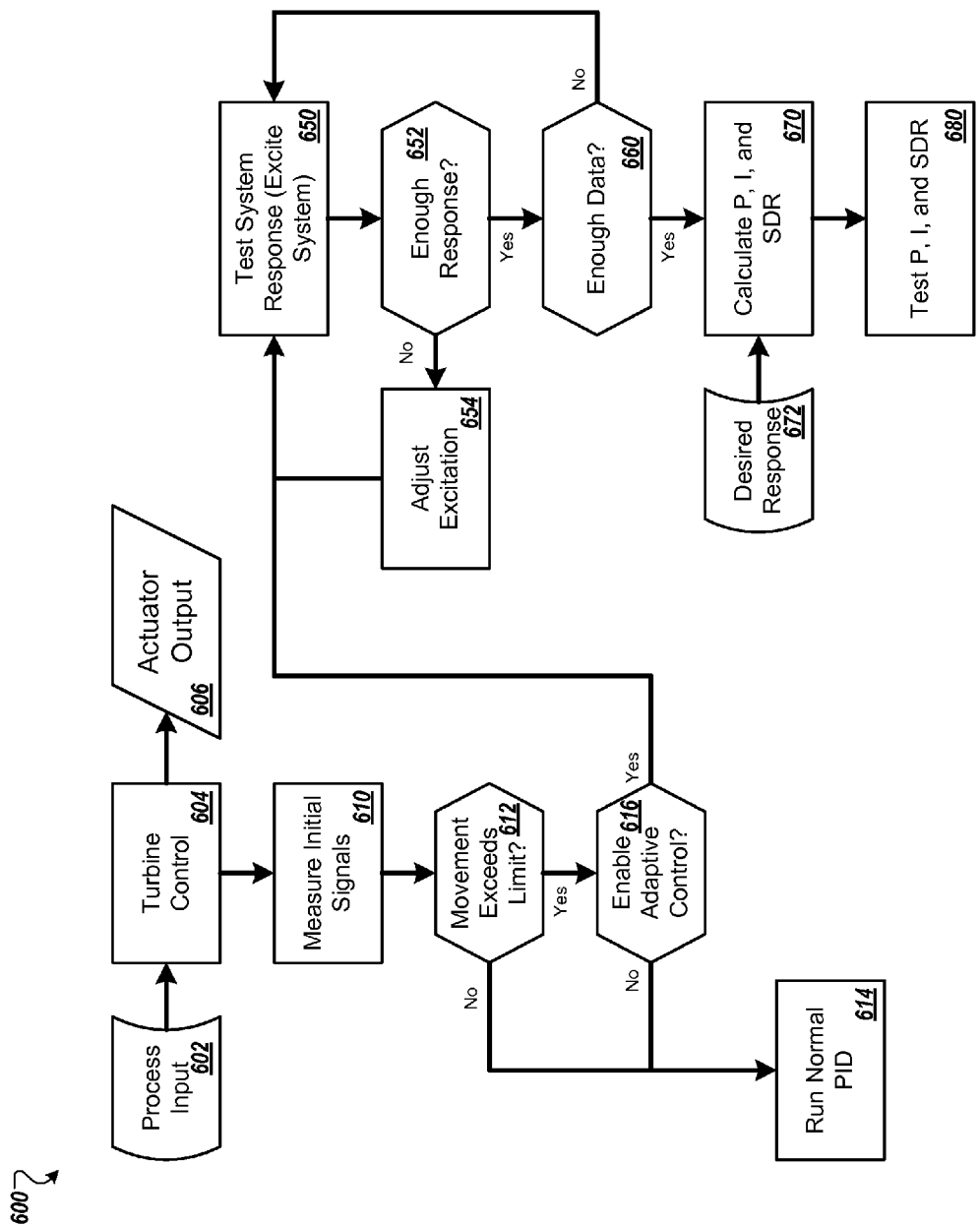
FIG. 6 is flow chart that shows another example of a process for determining PID control parameters.

FIG. 6 is flow chart that shows another example of a process 600 for determining PID control parameters. In some implementations, the process 600 can be performed by the industrial turbine control system 100. In some implementations, the process 600 can be a more detailed embodiment of the process 500 of FIG. 5.

A process input 602 is provided to a turbine control process 604. The turbine control process 604 controls a turbine to provide an actuator output 606. For example, the process input 602 can be a speed parameter, and the turbine control process 604 can be a speed control process for the turbine by actuating a fuel or steam valve as the actuator output 606.

At 610, the initial signals are measured. The initial signals are provided by a feedback sensor that can be used to measure one or more outputs of the turbine. For example, the sensor 130 can provide the feedback signal 132, and the feedback signal 132 can be processed to determine the initial control state.

At 612 a determination is made. If the movement exceeds the user selected movement limit, then a normal PID loop is performed at 614. For example, the parameter controller 140 can determine that the turbine 112 is not operating at steady state, and in response the parameter controller 140 can allow the PID controller 120 to continue to control the turbine assembly 110.

If the system movement is acceptable, at 616 another determination is made. If adaptive control is not enabled, a normal PID loop is performed at 614. If adaptive control is enabled, the system response is tested at 650. For example, the parameter controller 140 can provide a desired output setting as the input parameter 122 to the PID controller 120.

At 652 a determination is made. If an insufficient response is received from the turbine in response to the input parameter, at 654 the excitation (e.g., input parameter 122) is adjusted. If a sufficient response is received from the turbine in response to the input parameter, another determination is made at 660.

If at 660, an insufficient amount of data about the response of the turbine to the input parameter has been received, the system response continues to be tested at 650. If at 660, enough data about the response of the turbine to the input parameter has been received, at 670 the P gain, the I gain, and the SDR gain are calculated based on a desired response 672. At 680, the calculated P, I, and SDR gains are tested. For example, the parameter controller 140 can provide the control parameters 142 to the PID controller 120 for use as the control parameters 124, and the response of the turbine assembly 110 can be evaluated to test the performance of the calculated P, I, and SDR gains for the input parameter 122.

Figure 7:
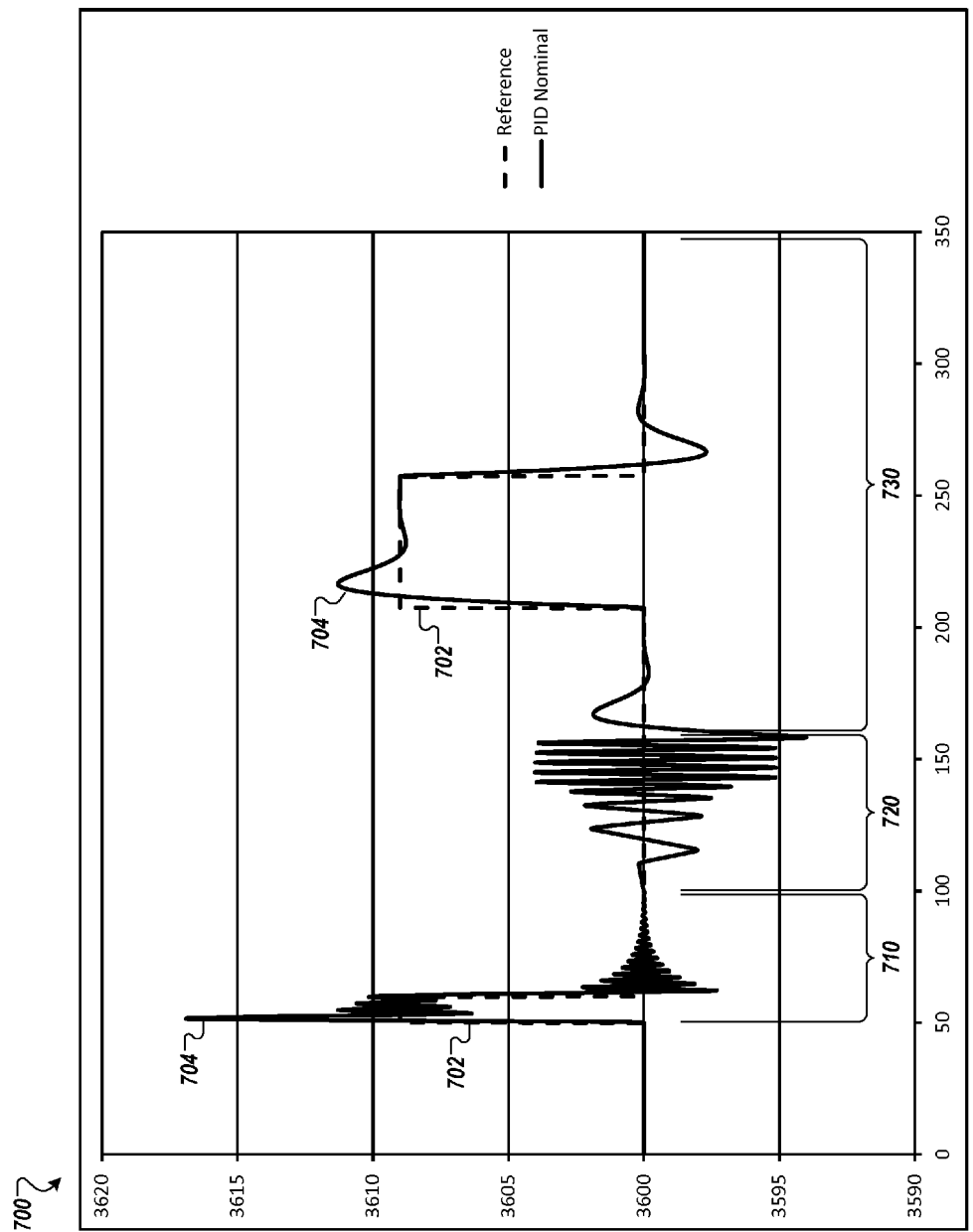
FIG. 7 is a chart showing an example result of tuning an industrial turbine controller having an initially underdamped response.

FIG. 7 is a chart 700 showing an example result of tuning an industrial turbine PID controller controlling a steam turbine off line, pulling a vacuum, with an initially underdamped response. The steam turbine system is modeled with a 0.5 Hz actuator with 20 mS dead time, a control recursion rate of 5 mS, and a turbine with 0.001% damping, running at 3600 RPM, with no load. The desired process movement limit was 0.5%, and the actuator movement was limited to 0.025%. The initial P term was set to 0.0001, the initial I term was set to 0.0001, and SDR was set to 100, denoting a PI controller configuration. The chart 700 represents time (in seconds) along the x-axis, and the y-axis represents the measured process output parameter, e.g., rotational speed in RPMs in this example. The chart 700 includes a collection of reference input values 702 and a collection of response output values 704 for an industrial turbine, such as the turbine 112 of the example system shown in FIG. 1. During a time period 710, from about the 50 s mark to about the 100 s mark, the turbine is excited while operating under an initial P gain, I gain, and D gain. The response output values 704 show that the system is marginally stable under the initial collection of gain settings, and exhibits traits indicative of initial gain settings that may be too high.

During a time period 720, from about the 100 s mark to about the 157 s mark, the turbine is perturbed, for example by the parameter controller 140. In some implementations, the system gain and relative system gain can be determined by measuring the ratio of process movement, to output demand movement. The system response frequency can be determined by measuring the frequency of the process response. The relative system dead time can be determined by measuring the delay between the movement of the output demand, and the process movement. As seen by the system settings above, and the plots, the system dead time is minimal. These parameters can be used to determine updated P, I, and D gain values, as explained above. The updated P, I, and SDR gain values, are 0.0015, 0.21, and 6.85, respectively. The process for determining the D gain value is selected based on the SDR gain value. If SDR>1, then D=1/[(SDR)(I)]. If SDR<1, then D=SDR/I. If [(SDR>=100) or (SDR<=0.01)], then the control is a PI control and D is set to 0. In the current example, the corresponding D value would be 0.69. Those updated P, I, and D gains are then provided to the PID controller for use in the control of the turbine.

During a time period 730, from about the 157 s mark onward, the turbine is controlled using the updated P, I, and D gains. The response of the system during the time period 730 (e.g., after adjustment by the parameter controller 140) is more stable than the system's response during the time period 710 (e.g., prior to adjustment by the parameter controller 140).

Figure 8:
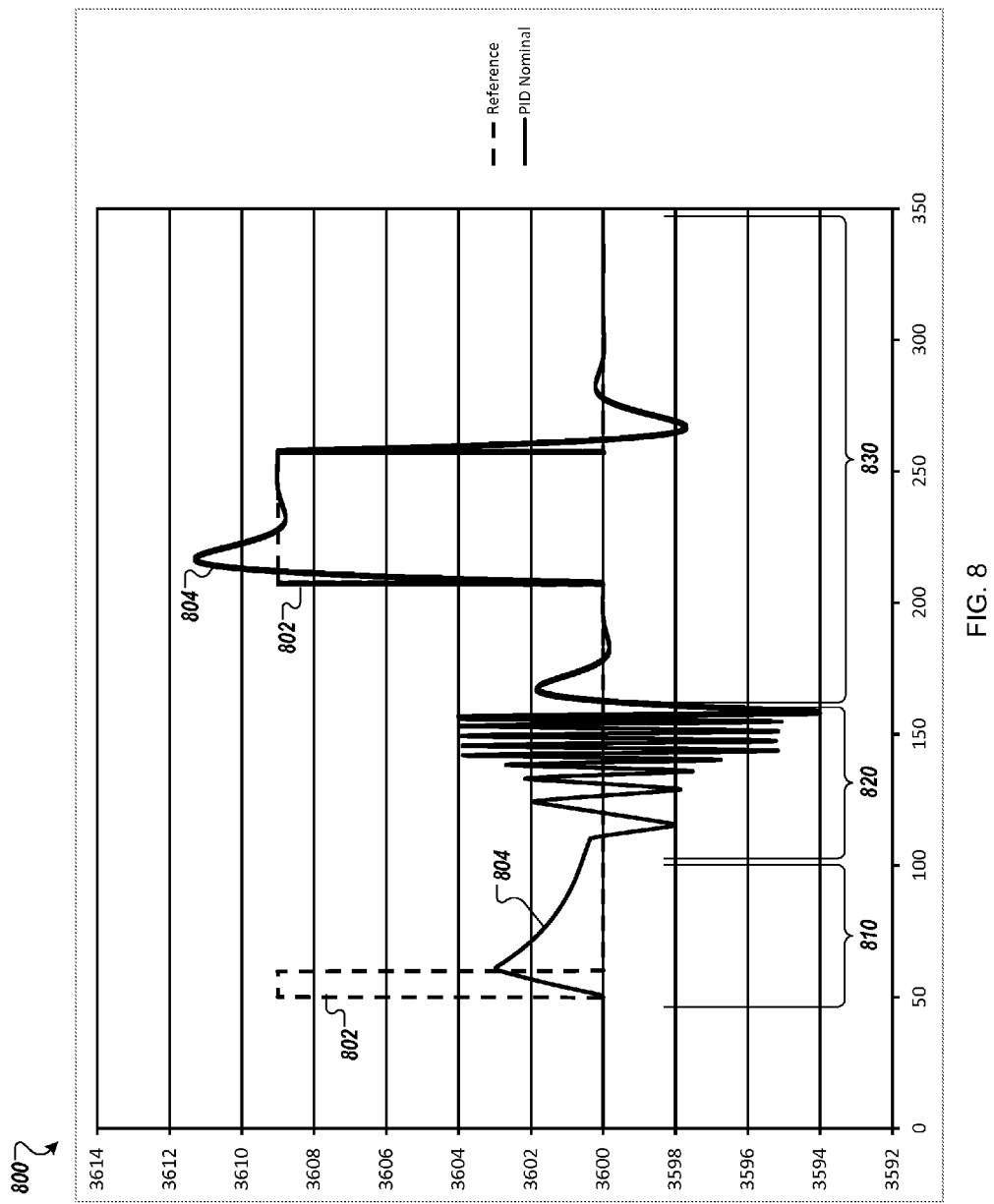
FIG. 8 is a chart showing an example result of tuning an industrial turbine controller having an initially overdamped response.

FIG. 8 is a chart 800 showing an example result of tuning an industrial turbine PID controller controlling a steam turbine, off line, pulling a vacuum, with an initially overdamped response. Again, the steam turbine system is modeled with a 0.5 Hz actuator with 20 mS dead time, a control recursion rate of 5 mS, and a turbine with 0.001% damping, running at 3600 RPM, with no load. The desired process movement limit was 0.5%, and the actuator movement was limited to 0.025%. The initial P term was set to 0.01, the initial I term was set to 0.01, and SDR was set to 100, denoting a PI controller configuration. The chart 800 represents time (in seconds) along the x-axis, and y-axis represents the measured process output parameter, e.g., rotational speed in RPMs in this example. The chart 800 includes a collection of reference input values 802 and a collection of response output values 804 for an industrial turbine, such as the turbine 112 of the example system shown in FIG. 1. During a time period 810, from about the 50 s mark to about the 100 s mark, the turbine is excited while operating under an initial P gain, I gain, and D gain. The response output values 804 show that the system is overdamped (e.g., sluggish response) and did not reach the set point during the given time period 810. Such behavior can be indicative of initial gain settings that may be too low.

During a time period 820, from about the 100 s mark to about the 157 s mark, the turbine is perturbed, for example by the parameter controller 140, and the response of the turbine is processed. In some implementations, the system gain and relative system gain can be determined by measuring the ratio of process movement, to output demand movement. The system response frequency can be determined by measuring the frequency of the process response. The relative system dead time can be determined by measuring the delay between the movement of the output demand, and the process movement. These parameters are used to determine updated P, I, and D gain values, as explained above. Those updated P, I, and D gains are then provided to the PID controller for use in the control of the turbine.

During a time period 830, from about the 157 s mark onward, the turbine is controlled using the updated P, I, and SDR gains, of 0.0015, 0.21, and 6.85, respectively. The response of the system during the time period 830 (e.g., after adjustment by the parameter controller 140) is more responsive than the system's response during the time period 810 (e.g., prior to adjustment by the parameter controller 140). Note that FIGS. 7 and 8 show repeatable P, I, and D terms, as well as repeatable responses for each of the tuning sequences with good performance and good margin (fast response, minimal ringing), regardless of the initial values used by the PID controller 120 and the initial response of the PID controller 120 and the turbine assembly 110. The parameter controller 140 can work as well with a system that is initially sluggish, overdamped, and unresponsive, as with a system which is marginally stable and ringing.

Figure 9:
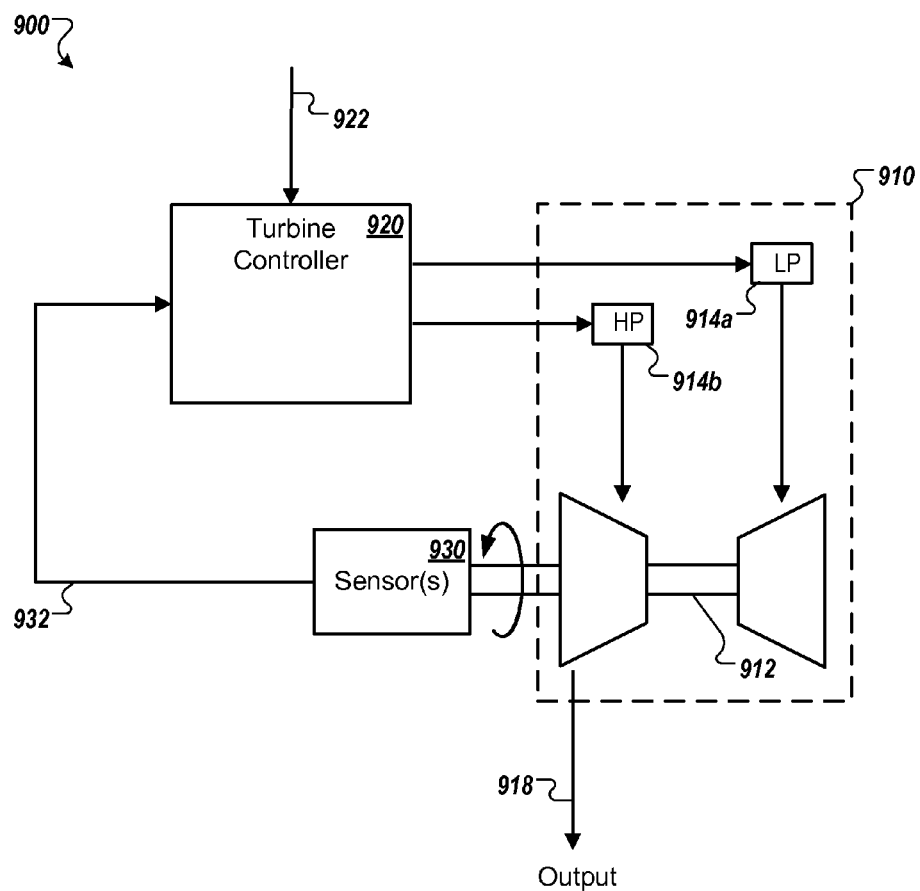
FIG. 9 is a schematic diagram that shows an example of another industrial turbine control system.

FIG. 9 is a schematic diagram that shows an example of another industrial turbine control system 900. A turbine assembly 910 includes a turbine 912, a controllable low pressure (LP) input 914a and a controllable high pressure (HP) input 914b for controlling the flow of a collection of one or more fluid or steam supplies to or from the turbine 912. By controllably adjusting the LP input 914a and the HP input 914b to control the flows of the steam/fluid supplies to/from the turbine 912, the rotational speed, load, acceleration, deceleration, and other performance parameters of the turbine 912 can be controllably adjusted. In some embodiments, the turbine assembly 910 can be the turbine assembly 110 of FIG. 1. In some embodiments, the LP input 914a and the HP input 914b can be the controllable inputs 114 of FIG. 1.

In the example system shown in FIG. 9, the LP and HP inputs 914a-914b are adjusted by a turbine controller 920. The turbine controller 920 adjusts the LP an HP inputs 914a-914b based on a collection of input parameters 922 (e.g., desired turbine speed, desired pressure), one or more feedback signals 932 provided by one or more sensors 930 configured to sense the speed and pressure of the turbine 912, a collection of outputs 918, and combinations of these or other appropriate operational parameters of the turbine 912, and a collection of control parameters in a closed-loop feedback control system. In some embodiments, the sensors 930 can be the sensor 130 of FIG. 1. The turbine controller 920 and its operations will be discussed further in the descriptions of FIGS. 10-22.

Figure 10:
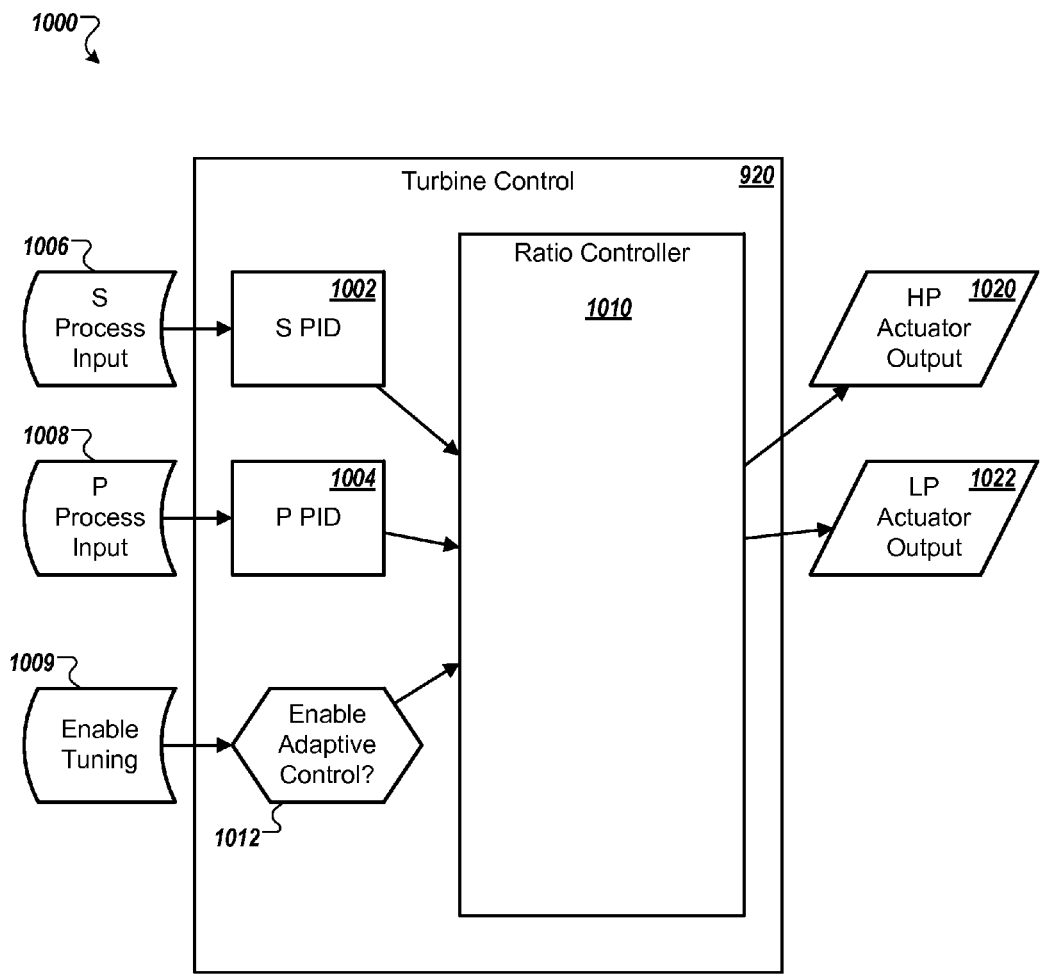
FIG. 10 is a block diagram of an example turbine controller.

FIG. 10 is a block diagram 1000 of the example turbine controller 920 of FIG. 9. The turbine controller 920 includes a speed (S) PID controller 1002 and an extraction pressure (P) PID controller 1004. The S PID controller 1002 receives an S process input value 1006 (e.g., a user provided desired speed value), and the P PID controller 1004 receives a P process input value 1008 (e.g., a user provided desired extraction pressure value). In some embodiments, the S PID controller 1002 and the P PID controller 1004 can each be examples of the PID controller 120 of FIG. 1.

The turbine controller 920 includes a ratio controller 1010. The ratio controller 1010 provides a high pressure (HP) actuator output 1020 and a low pressure (LP) actuator output 1022. In operation, the LP actuator output 1022 is provided to an LP actuator such as the LP input 914a of FIG. 9 (e.g., to control a valve on the low pressure side of the turbine 912). In operation, the HP actuator output 1020 is provided to an HP actuator such as the HP input 914b of FIG. 9 (e.g., to control a valve on the high pressure side of the turbine 912).

Figure 11:
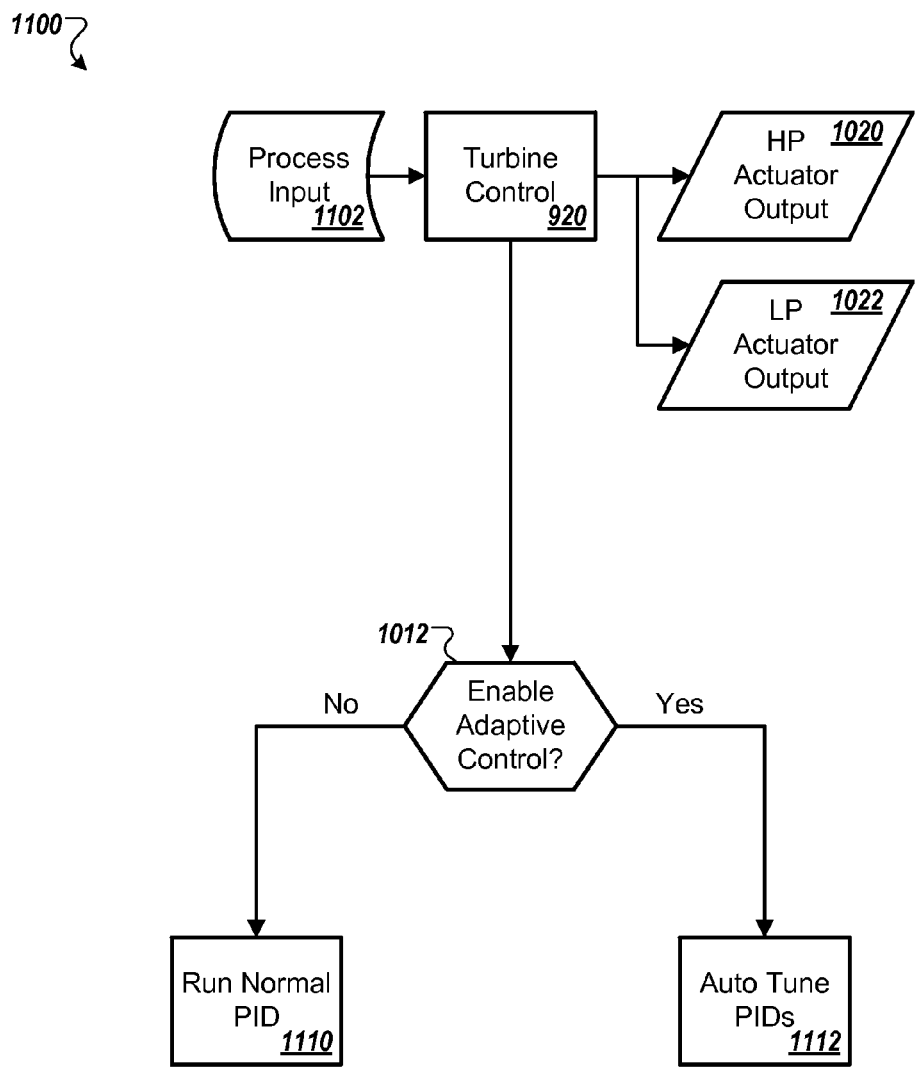
FIG. 11 is a flow diagram of an example process for selecting a turbine controller operational mode.

The turbine controller 920 is also configured to receive a tuning enable input 1009. An adaptive control selector 1012 is configured to alter the operation of the turbine controller 920 based on the state of the tuning enable input 1009. Referring now to FIG. 11, a flow diagram 1100 shows an example process for selecting an operational mode of the example turbine controller 920 of FIG. 9. In the example flow diagram 1100, the turbine controller 920 receives a collection of process inputs 1102, such as the S input 1002, the P input 1004, and the tuning enable input 1009 of FIG. 10, and provides the HP actuator output 1020 and the LP actuator output 1022.

The adaptive control selector 1012 alters the operation of the turbine controller 920 based on the process inputs 1102 (e.g., the tuning enable input 1009 of FIG. 10) to cause the turbine controller 920 to operate in either a normal PID operation mode 1110 or an automatic PID tuning mode 1112.

Figure 12:
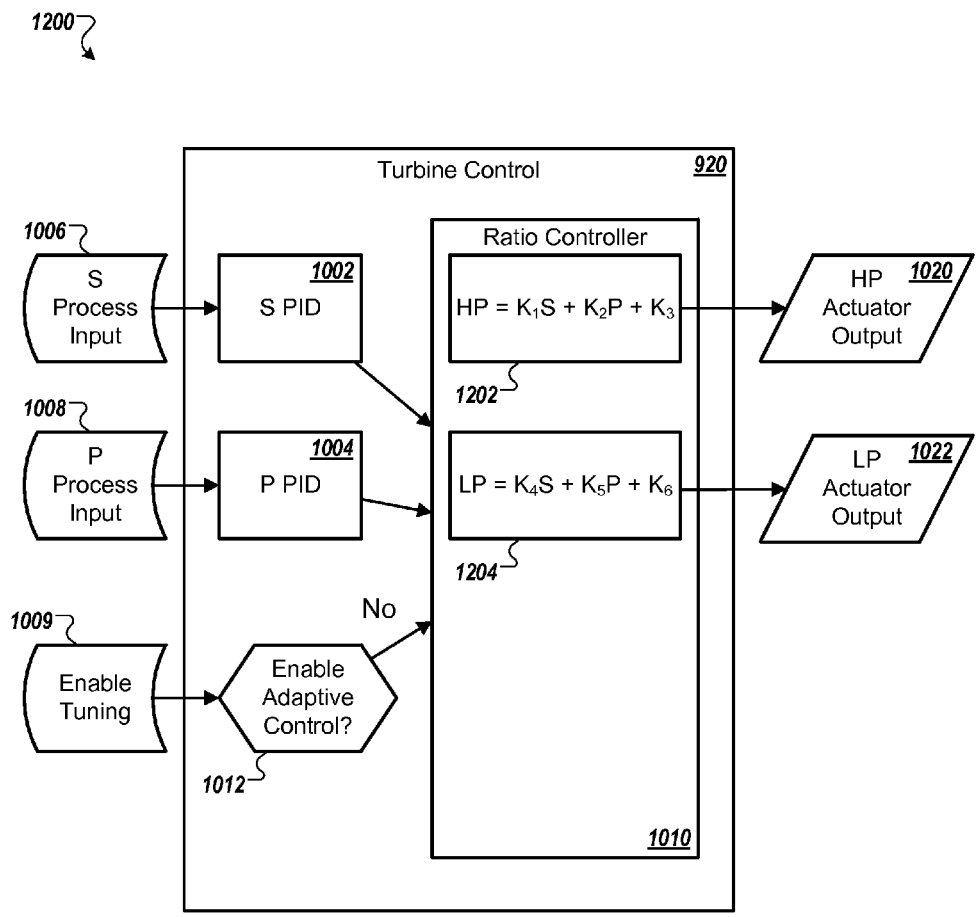
FIG. 12 is a block diagram of an example turbine controller in a normal operational mode.

FIG. 12 is a block diagram 1200 of the example turbine controller 920 of FIG. 9 in the normal PID operation mode 1110 of FIG. 11. Under normal operation (e.g., the tuning enable input 1009 is off), the HP actuator output 1020 and the LP actuator output 1022 are based on the output values of the S PID 1002 and the P PID 1004 received by the ratio controller 1010. The ratio controller 1010 modifies the output values of the PIDs 1002-1004 using a scaler 1202 and a scaler 1204.

The turbine controller 920 is an example of a Multi-Input Multi-Output (MIMO) control system (e.g., a system with more than one control input and more than one control output). In some implementations, one of the actuator outputs 1020, 1022 can affect both of the control inputs 1006, 1008, and the system is said to have "interaction". Interaction can be reduced by use of a steam map, or ratio-limiter. Ratio refers to applying scaling terms to the demands of each of the control loops, such that each control loop controls both valves with minimal effect on the other control loop. Limiting refers to the case in which a controlled output (e.g., the LP input 914a and/or the HP input 914b) reaches its controlling limit. The calculation of the ratio gains, which are also referred to as "K" coefficients, is determined by converting a performance curve for a turbine into a turbine control operational envelope. In some examples, the performance curve may be provided by the manufacturer of the turbine, and from this information a turbine control operational envelope can be determined. In some examples, such an operational envelope may be referred to as a steam map. An example of a steam map that can be used to determine K coefficients is discussed in the description of FIG. 23.

In the present example, ratio gains are referred to as "K" coefficients. The K coefficients are combined with the classical PID outputs for the speed (S) PID controller 1002 and the extraction pressure (P) PID controller 1004 to provide the components for the scaler 1202 and the scaler 1204 calculations for the valve demands.

In the illustrated example, the scaler 1202 provides the HP actuator output 1020 based on the equation:

$$HP=K_1S+K_2P+K_3$$

The scaler 1204 provides the LP actuator output 1022 based on the equation:

$$LP=K_4S+K_5P+K_6$$

Figure 13:
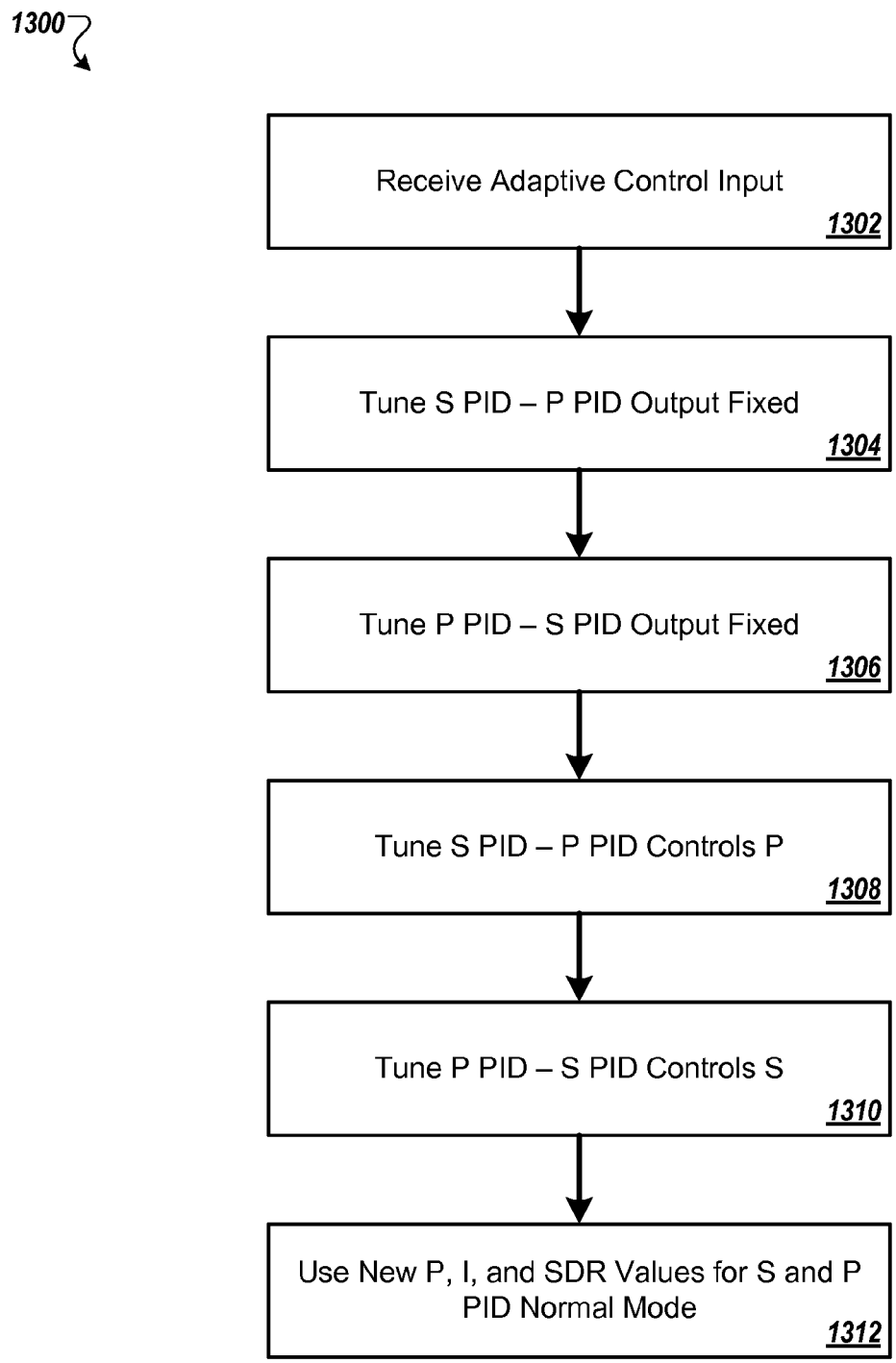
FIG. 13 is a flow diagram of an example process for tuning multiple actuator controllers.

FIG. 13 is a flow diagram of an example process 1300 for tuning multiple actuator controllers. In some implementations, the process 1300 can be used by the example turbine controller 920 to tune the example turbine system 900 of FIG. 9. When automatic tuning is turned on (e.g., the tuning enable input 1009 of FIG. 10 is on), the example turbine controller 920 of FIG. 9 alters the operations of the S PID controller 1002, the P PID controller 1004, and the ratio controller 1010 to tune the operational parameters of the S PID controller 1002 and the P PID controller 1004.

At 1302, an adaptive control input is received. For example, the turbine controller 920 can receive the tuning enable input 1009 to put the turbine controller 920 into an automatic tuning operational mode.

At 1304 the S PID controller 1002 is tuned while the P PID controller 1004 output is overridden with a fixed output value. For example, the S PID controller 1002 can be exercised through a range of set points to examine the performance of the example turbine system 900 substantially independent of the influence of the P PID controller 1004, the output of which is otherwise interactive with that of the S PID controller 1002. The P, I, and SDR parameters of the S PID controller 1002 are then updated based on the observed performance of the turbine system 920.

At 1306 the P PID controller 1004 is tuned while the s PID controller 1002 output is overridden with a fixed output value. For example, the P PID controller 1004 can be exercised through a range of set points to examine the performance of the example turbine system 900 substantially independent of the influence of the S PID controller 1002, the output of which is otherwise interactive with that of the P PID controller 1004. The P, I, and SDR parameters of the P PID controller 1004 are then updated based on the observed performance of the turbine system 920.

At 1308 the S PID controller 1002 is tuned while the P PID controller 1004 is allowed to operate normally. For example, the S PID controller 1002 can be exercised through a range of set points to examine the performance of the example turbine system 900 as the influence of the P PID controller 1004 is allowed to interact with the output of the S PID controller 1002. The P, I, and SDR parameters of the S PID controller 1002 are then updated based on the observed performance of the turbine system 920.

At 1310 the P PID controller 1004 is tuned while the S PID controller 1002 is allowed to operate normally. For example, the P PID controller 1004 can be exercised through a range of set points to examine the performance of the example turbine system 900 as the influence of the S PID controller 1002 is allowed to interact with the output of the P PID controller 1004. The P, I, and SDR parameters of the P PID controller 1004 are then updated based on the observed performance of the turbine system 920.

At 1312, the turbine controller 920 uses the determined values of P, I, and SDR for each of the S PID controller 1002 and the P PID controller 1004 to operate in a normal operational mode (e.g., both PID controllers 1002, 1004 operating normally).

Figure 14:
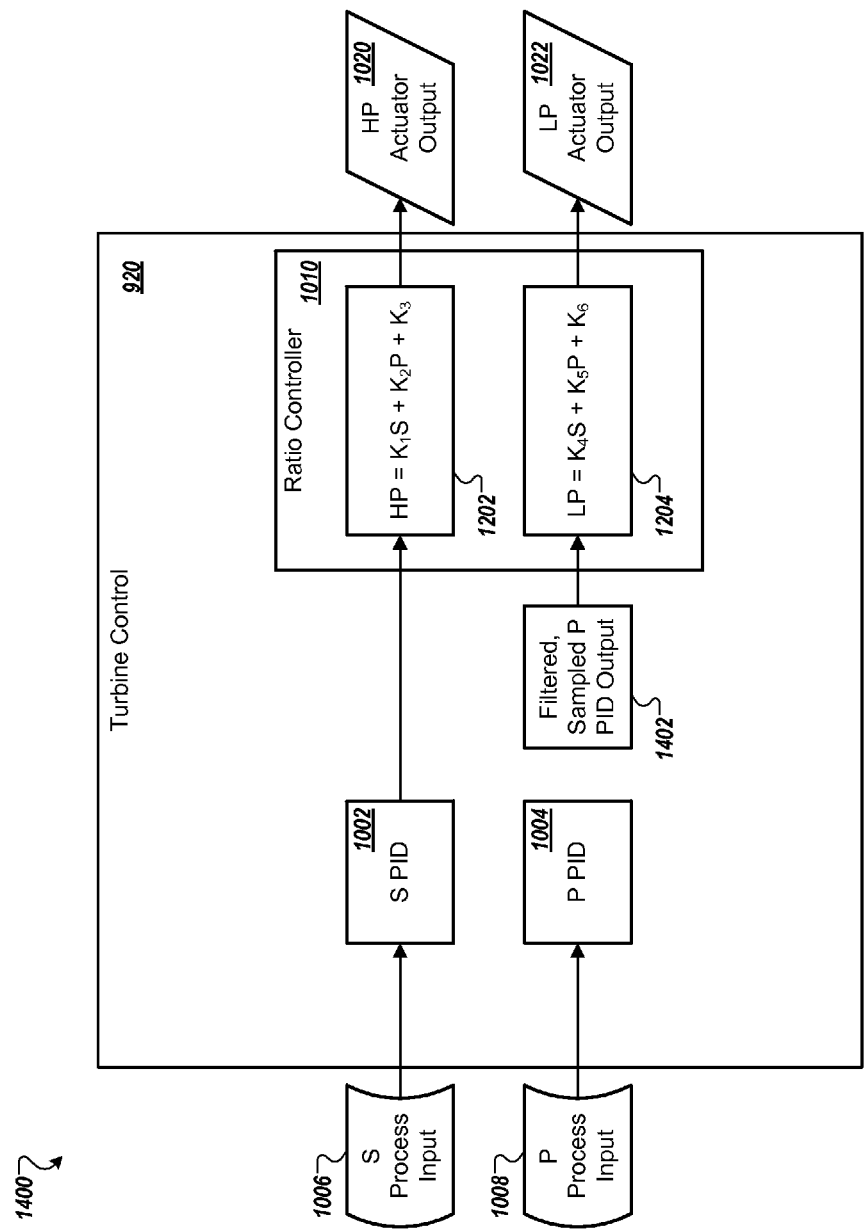
FIG. 14 is a block diagram of an example turbine controller in a tuning mode.

FIG. 14 is a block diagram of the example turbine controller 920 of FIG. 12 in a tuning mode configuration

1400. In some implementations, the configuration 1400 can be used by the turbine controller 920 to perform step 1304 of the example process 1300 of FIG. 13.

In the illustrated example, the ratio controller 1010 receives an S output from the S PID controller 1002. The output of the P PID controller 1004, however, is intercepted, and is replaced by a simulated P output 1402. In some implementations, the simulated P output 1402 can be a constant value. In some implementations, the simulated P output 1402 can be a filtered, sampled value of the P output of the P PID controller 1004. The HP actuator output 1020 and the LP actuator output 1022 are determined based on the actual S output of the S PID controller 1002 and on the simulated P output 1402.

Figure 15:
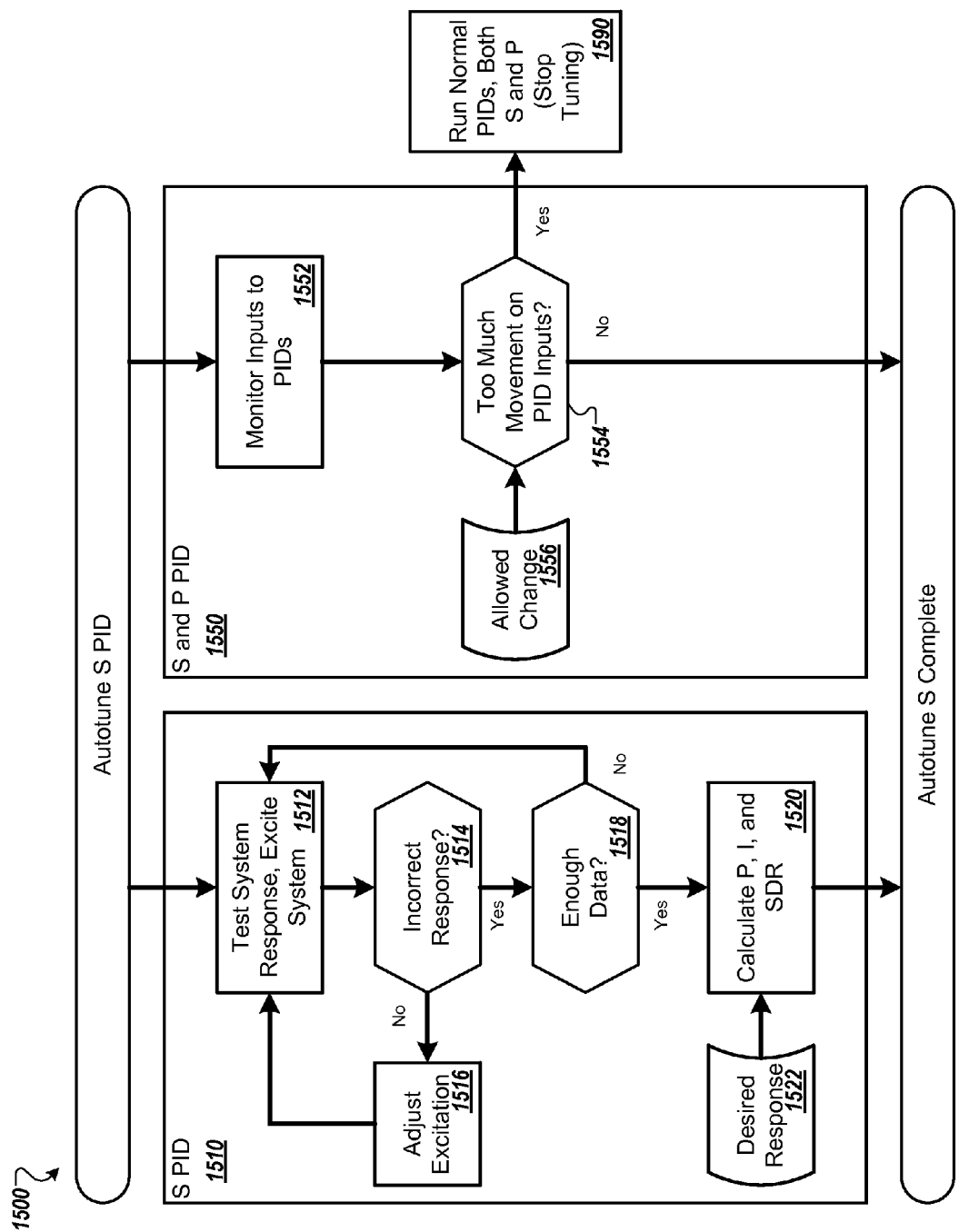
FIG. 15 is a flow diagram of an example process stage for tuning multiple actuator controllers.

FIG. 15 is a flow diagram of an example process stage 1500 for tuning multiple actuator controllers. In some implementations, the process stage 1500 can be the step 1304 of the example process 1300 of FIG. 13. In some implementations, the process stage 1500 may be performed by the example configuration 1400 of FIG. 14.

In general, the process stage 1500 includes two sub processes. A sub process 1510 adjusts the S PID controller 1002 of FIG. 10 through a range of values as part of an automatic tuning process for the S PID controller 1002. A sub process 1550 monitors the inputs of both the S PID controller 1002 and the P PID controller 1004. In some implementations, the sub processes 1510 and 1550 can run substantially in parallel.

In the sub process 1510, at step 1512, the system response of the S PID controller 1002 is tested by providing predetermined excitation values. If at step 1514 the turbine controller 920 determines that an incorrect excitation is being provided to the S PID controller 1002, then at step 1516 the excitation level is adjusted (e.g., higher or lower). If at step 1514, the turbine controller 920 determines that a correct level of excitation is being provided to the S PID controller 1002, then another determination is made at step 1518.

At step 1518, if the turbine controller 920 determines that not enough data has been collected (e.g., turbine system response data), then the S PID controller 1002 is stimulated again at step 1512. If the turbine controller 920 determines that enough data has been collected, then at step 1520 new P, I, and SDR values are determined for the S PID controller 1002 based on a desired response 1522. In some implementations, the new P, I, and SDR values can be determined using the example process 300 of FIG. 3, the example process 400 of FIG. 4, the example process 500 of FIG. 5, the example process 600 of FIG. 6, and/or the example process 1300 of FIG. 13.

The sub process 1550 includes a step 1552 at which the inputs to the S PID controller 1002 and the P PID controller 1004 are monitored. At 1554, if there is more than a predetermined threshold amount of movement on the PID controllers' inputs based on an allowed change input value 1556, then at 1590 tuning is stopped and the S PID controller 1002 and the P PID controller 1004 are allowed to run normally. If at 1554, the amount of movement on the PID controllers' inputs does not exceed the predetermined threshold amount based on the input value 1556, then the process stage 1500 is allowed to complete.

Figure 16:
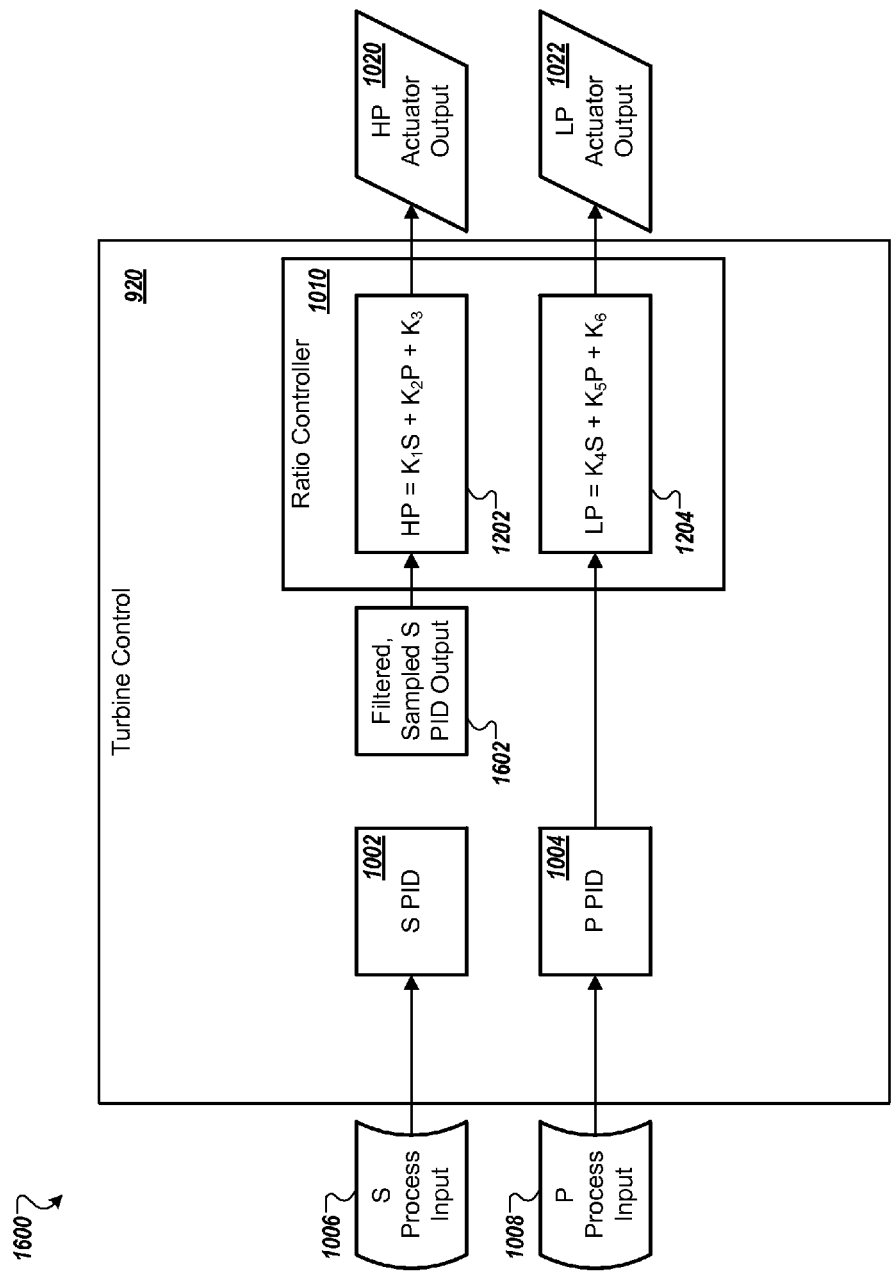
FIG. 16 is a block diagram of an example turbine controller in another tuning mode.

FIG. 16 is a block diagram of the example turbine controller 920 of FIG. 12 in another tuning mode configuration 1600. In some implementations, the configuration 1600 can be used by the turbine controller 920 to perform step 1306 of the example process 1300 of FIG. 13.

In the illustrated example, the ratio controller 1010 receives a P output from the P PID controller 1004. The output of the S PID controller 1002, however, is intercepted, and is replaced by a simulated S output 1602. In some implementations, the simulated S output 1602 can be a constant value. In some implementations, the simulated S output 1602 can be a filtered, sampled value of the S output of the S PID controller 1002. The HP actuator output 1020 and the LP actuator output 1022 are determined based on the actual P output of the P PID controller 1004 and on the simulated S output 1602.

Figure 17:
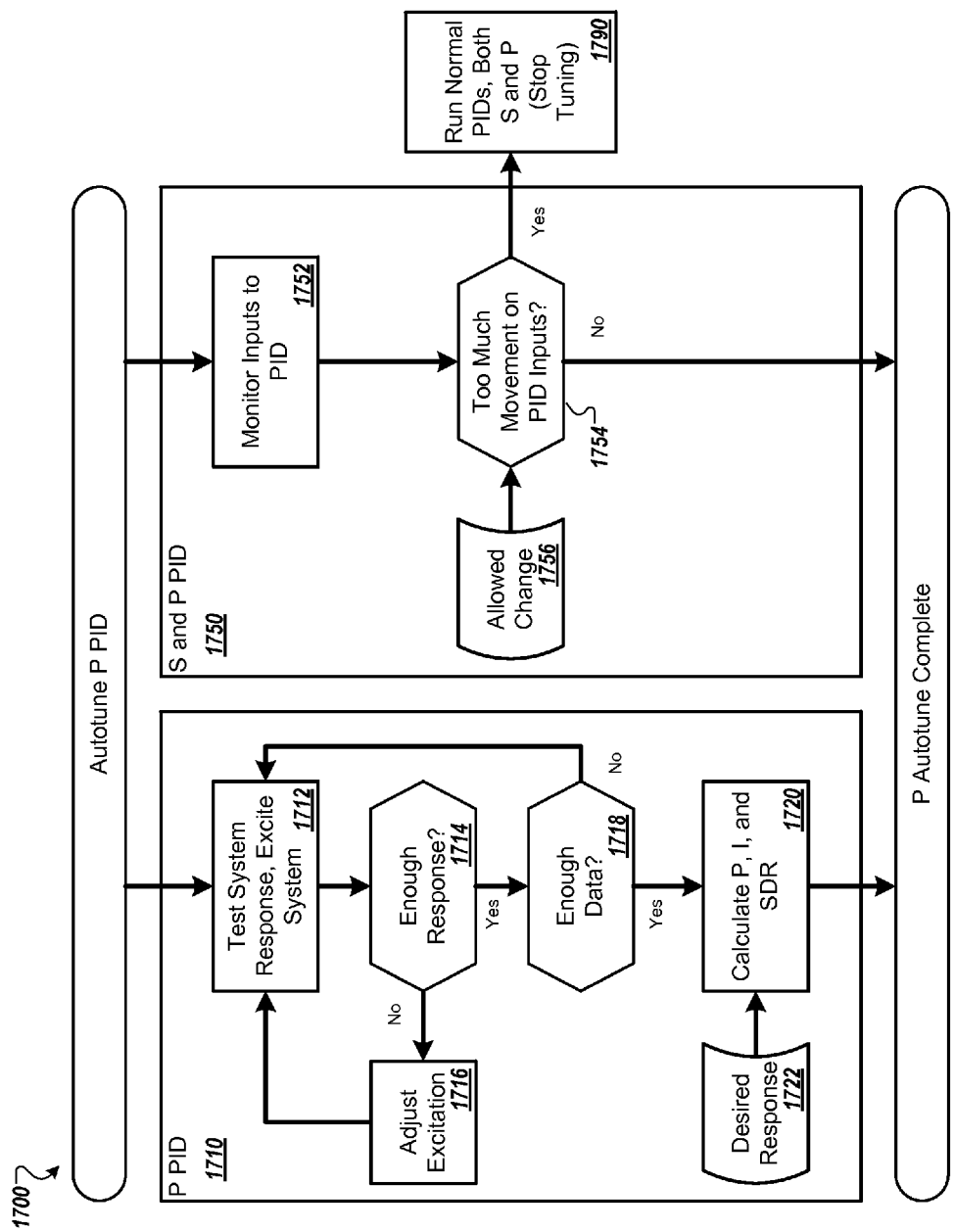
FIG. 17 is a flow diagram of another example process stage for tuning multiple actuator controllers.

FIG. 17 is a flow diagram of an example process stage 1700 for tuning multiple actuator controllers. In some implementations, the process stage 1700 can be the step 1306 of the example process 1300 of FIG. 13. In some implementations, the process stage 1700 may be performed by the example configuration 1600 of FIG. 16.

In general, the process stage 1700 includes two sub processes. A sub process 1710 adjusts the P PID controller 1004 of FIG. 10 through a range of values as part of an automatic tuning process for the P PID controller 1004. A sub process 1750 monitors the inputs of both the S PID controller 1002 and the P PID controller 1004. In some implementations, the sub processes 1710 and 1750 can run substantially in parallel.

In the sub process 1710, at step 1712, the system response of the P PID controller 1004 is tested by providing predetermined excitation values. If at step 1714 the turbine controller 920 determines that an incorrect excitation is being provided to the P PID controller 1004, then at step 1716 the excitation level is adjusted (e.g., higher or lower). If at step 1714, the turbine controller 920 determines that a correct level of excitation is being provided to the P PID controller 1004, then another determination is made at step 1718.

At step 1718, if the turbine controller 920 determines that not enough data has been collected (e.g., turbine system response data), then the P PID controller 1004 is stimulated again at step 1712. If the turbine controller 920 determines that enough data has been collected, then at step 1720 new P, I, and SDR values are determined for the P PID controller 1004 based on a desired response 1722. In some implementations, the new P, I, and SDR values can be determined using the example process 300 of FIG. 3, the example process 400 of FIG. 4, the example process 500 of FIG. 5, the example process 600 of FIG. 6, and/or the example process 1300 of FIG. 13.

The sub process 1750 includes a step 1752 at which the inputs to the S PID controller 1002 and the P PID controller 1004 are monitored. At 1754, if there is more than a predetermined threshold amount of movement on the PID controllers' inputs based on an allowed change input value 1756, then at 1790 tuning is stopped and the S PID controller 1002 and the P PID controller 1004 are allowed to run normally. If at 1754, the amount of movement on the PID controllers' inputs does not exceed the predetermined threshold amount based on the input value 1756, then the process stage 1700 is allowed to complete.

Figure 18:
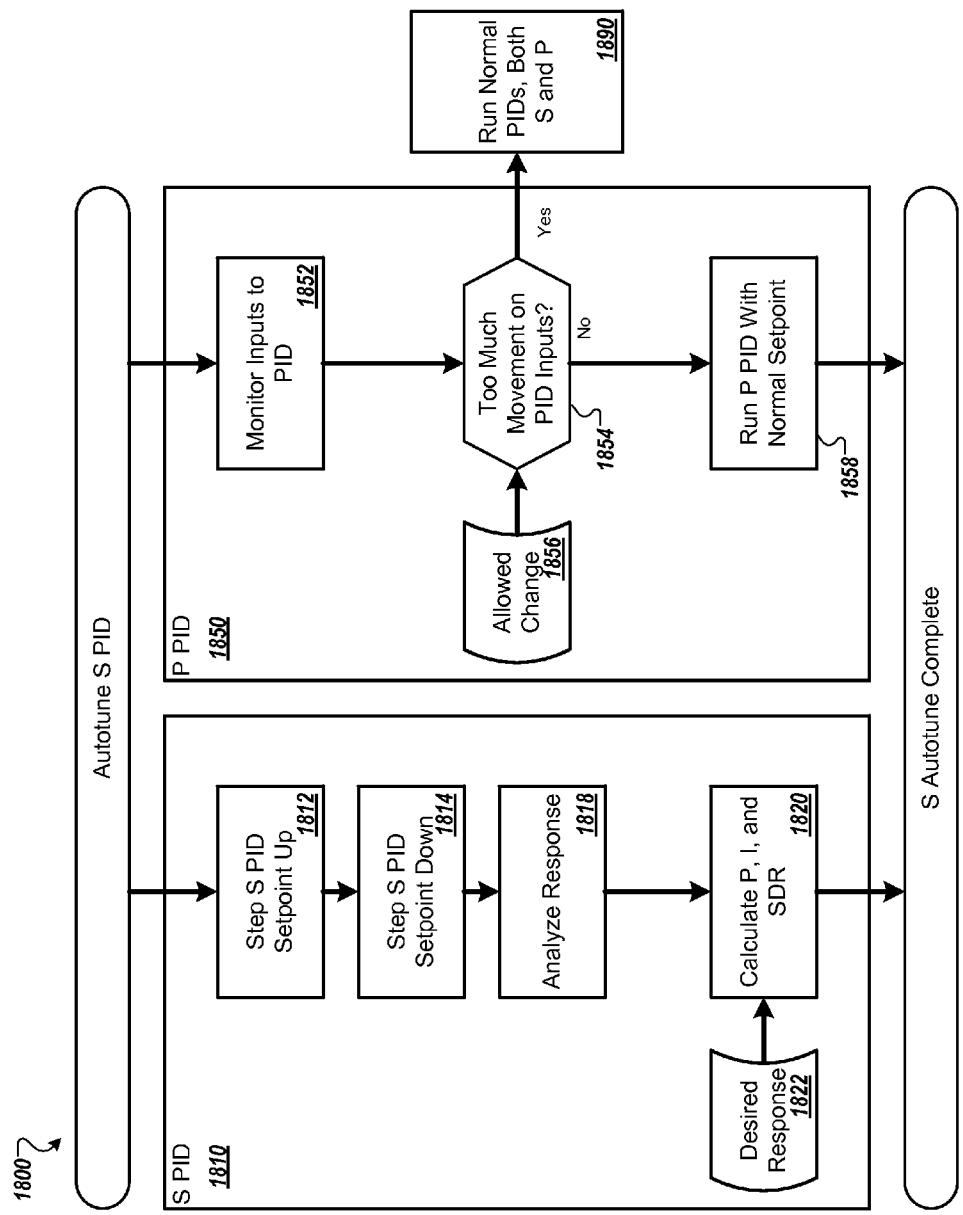
FIG. 18 is a flow diagram of another example process stage for tuning multiple actuator controllers.

FIG. 18 is a flow diagram of an example process stage 1800 for tuning multiple actuator controllers. In some implementations, the process stage 1800 can be the step 1308 of the example process 1300 of FIG. 13. In some implementations, the process stage 1800 may be performed by the example configuration 1200 of FIG. 12.

In general, the process stage 1800 includes two sub processes. A sub process 1810 adjusts the S PID controller 1002 of FIG. 10 through a range of values as part of an automatic tuning process for the S PID controller 1002. A sub process 1850 monitors the inputs of the P PID controller 1004. In some implementations, the sub processes 1810 and 1850 can run substantially in parallel.

In the sub process 1810, at step 1812, the system response of the S PID controller 1002 is tested by stepping the set point of the S PID controller 1002 up and observing the response of the turbine system 900. At step 1814, the system response of the S PID controller 1002 is tested by stepping the set point of the S PID controller 1002 down and observing the response of the turbine system 900. For example, steps 1812 and 1814 may exercise the S PID controller 1002 through a predetermined range of set points both above and below an expected set point.

At step 1818, if the turbine controller 920 analyzes the turbine system 900 response data produced during steps 1812 and 1814. At step 1820 new P, I, and SDR values are determined for the S PID controller 1002 based on a desired response 1822. In some implementations, the new P, I, and SDR values can be determined using the example process 300 of FIG. 3, the example process 400 of FIG. 4, the example process 500 of FIG. 5, the example process 600 of FIG. 6, and/or the example process 1300 of FIG. 13.

The sub process 1850 includes a step 1852 at which the inputs to the P PID controller 1004 are monitored. At 1854, if there is more than a predetermined threshold amount of movement on the PID controller's input based on an allowed change input value 1856, then at 1890 tuning is stopped and the S PID controller 1002 and the P PID controller 1004 are allowed to run normally. If at 1854, the amount of movement on the PID controller's inputs does not exceed the predetermined threshold amount based on the input value 1856, then the P PID controller 1004 is run with a normal set point.

Figure 19:
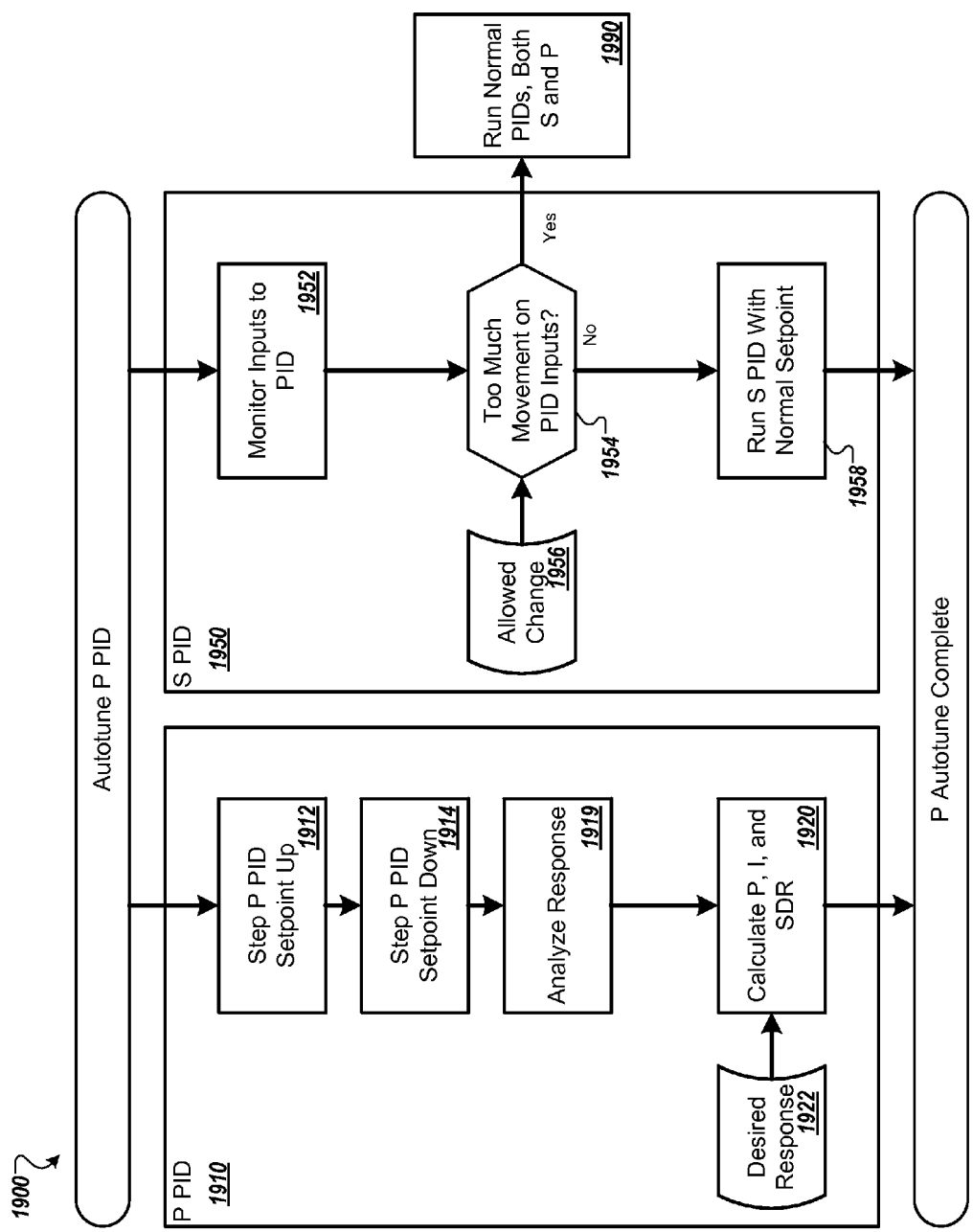
FIG. 19 is a flow diagram of another example process stage for tuning multiple actuator controllers.

FIG. 19 is a flow diagram of an example process stage 1900 for tuning multiple actuator controllers. In some implementations, the process stage 1900 can be the step 1310 of the example process 1300 of FIG. 13. In some implementations, the process stage 1900 may be performed by the example configuration 1200 of FIG. 12.

In general, the process stage 1900 includes two sub processes. A sub process 1910 adjusts the P PID controller 1004 of FIG. 10 through a range of values as part of an automatic tuning process for the P PID controller 1004. A sub process 1950 monitors the inputs of the S PID controller 1002. In some implementations, the sub processes 1910 and 1950 can run substantially in parallel.

In the sub process 1910, at step 1912, the system response of the P PID controller 1004 is tested by stepping the set point of the P PID controller 1004 up and observing the response of the turbine system 900. At step 1914, the system response of the P PID controller 1004 is tested by stepping the set point of the P PID controller 1004 down and observing the response of the turbine system 900. For example, steps 1912 and 1914 may exercise the P PID controller 1004 through a predetermined range of set points both above and below an expected set point.

At step 1919, if the turbine controller 920 analyzes the turbine system 900 response data produced during steps 1912 and 1914. At step 1920 new P, I, and SDR values are determined for the P PID controller 1004 based on a desired response 1922. In some implementations, the new P, I, and SDR values can be determined using the example process 300 of FIG. 3, the example process 400 of FIG. 4, the example process 500 of FIG. 5, the example process 600 of FIG. 6, and/or the example process 1300 of FIG. 13.

The sub process 1950 includes a step 1952 at which the inputs to the S PID controller 1002 are monitored. At 1954, if there is more than a predetermined threshold amount of movement on the PID controller's input based on an allowed change input value 1956, then at 1990 tuning is stopped and the S PID controller 1002 and the P PID controller 1004 are allowed to run normally. If at 1954, the amount of movement on the PID controller's inputs does not exceed the predetermined threshold amount based on the input value 1956, then the S PID controller 1002 is run with a normal set point.

Figure 20:
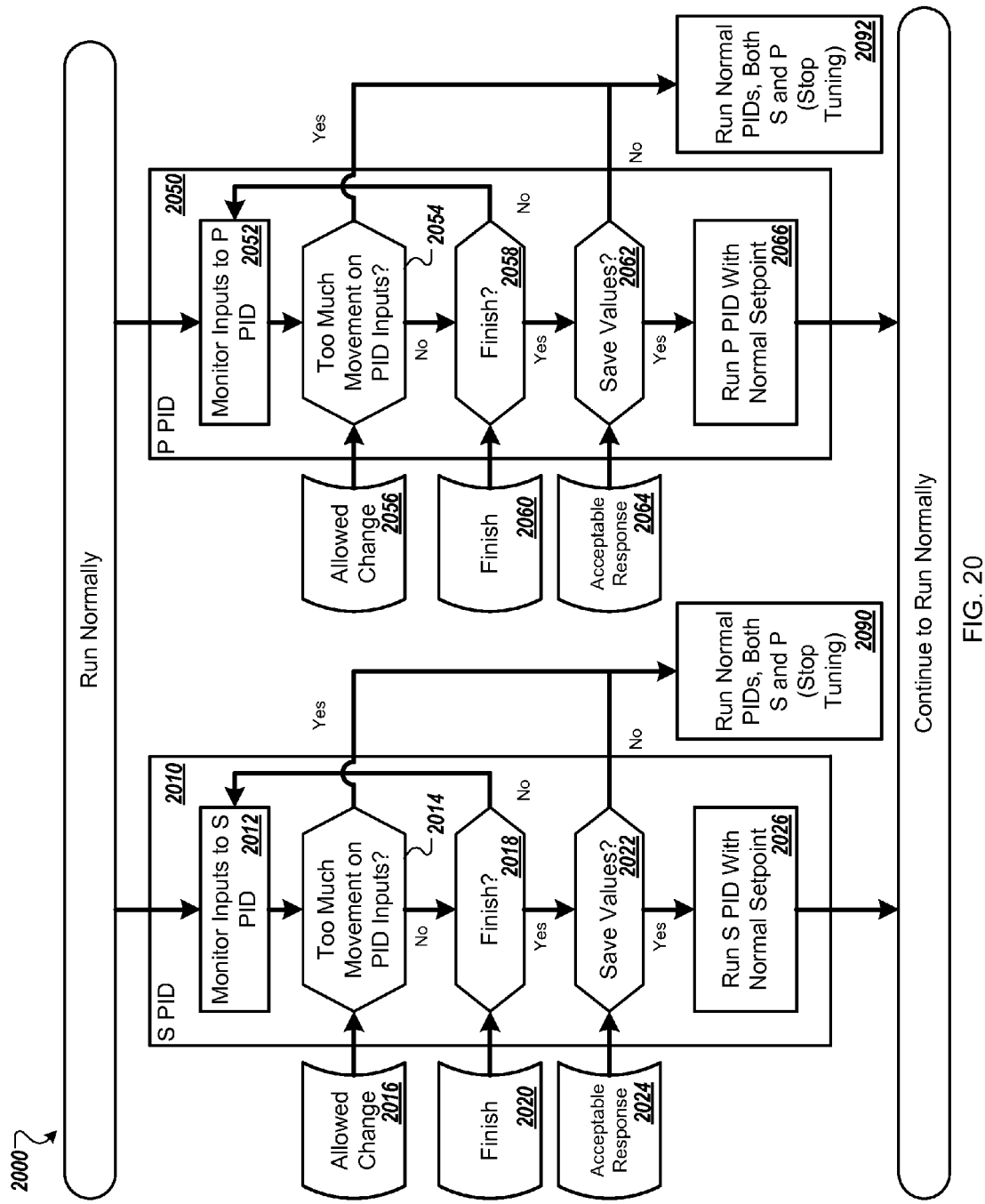
FIG. 20 is a flow diagram of another example process stage for tuning multiple actuator controllers.

FIG. 20 is a flow diagram of another example process stage 2000 for tuning multiple actuator controllers. In some implementations, the process stage 2000 can be the step 1312 of the example process 1300 of FIG. 13. In some implementations, the process stage 2000 may be performed by the example configuration 1200 of FIG. 12.

In general, the process stage 2000 includes two sub processes. A sub process 2010 monitors the S PID controller 1002 of FIG. 10 as part of an automatic tuning process for the S PID controller 1002. A sub process 2050 monitors the P PID controller 1004 of FIG. 10 as part of an automatic tuning process for the P PID controller 1004. In some implementations, the sub processes 2010 and 2050 can run substantially in parallel.

The sub process 2010 includes a step 2012 at which the inputs to the S PID controller 1002 are monitored. At 2014, if there is more than a predetermined threshold amount of movement on the PID controller's input based on an allowed change input value 2016 and/or the amount of input noise, then at 2090 tuning is stopped and the S PID controller 1002 and the P PID controller 1004 are allowed to run normally. If at 2014, the amount of movement on the PID controller's inputs does not exceed the predetermined threshold amount based on the input value 2016, then another determination is made.

At 2018, if the tuning process is not finished based on an input 2020 (e.g., a user input), then tuning continues at step 2012. If, at 2018, the tuning process is finished based on the input 2020, then another determination is made.

At 2022, if the P, I, and SDR values determined by the previous tuning steps are not to be saved based on an input 2024 (e.g., a user input), then at 2090 tuning is stopped and the S PID controller 1002 and the P PID controller 1004 are allowed to run normally, with the original P, I, and SDR values. If, at 2022, the P, I, and SDR values determined by the previous tuning steps are to be saved based on the input 2024, then at 2026 the S PID 1002 is run with a normal set point with the newly calculated P, I, and SDR values.

The sub process 2050 includes a step 2052 at which the inputs to the P PID controller 1004 are monitored. At 2054, if there is more than a predetermined threshold amount of movement on the PID controller's input based on an allowed change input value 2056, then at 2092 tuning is stopped and the S PID controller 1002 and the P PID controller 1004 are allowed to run normally, with the original P, I, and SDR values. If at 2054, the amount of movement on the PID controller's inputs does not exceed the predetermined threshold amount based on the input value 2056, then another determination is made.

At 2058, if the tuning process is not finished based on an input 2060 (e.g., a user input), then tuning continues at step 2052. If, at 2058, the tuning process is finished based on the input 2060, then another determination is made.

At 2062, if the P, I, and SDR values determined by the previous tuning steps are not to be saved based on an input 2064 (e.g., a user input), then at 2092 tuning is stopped and the S PID controller 1002 and the P PID controller 1004 are allowed to run normally, with the original P, I, and SDR values. If, at 2062, the P, I, and SDR values determined by the previous tuning steps are to be saved based on the input 2064, then at 2066 the P PID 1004 is run with a normal set point with the newly calculated P, I, and SDR values.

Figure 21A:
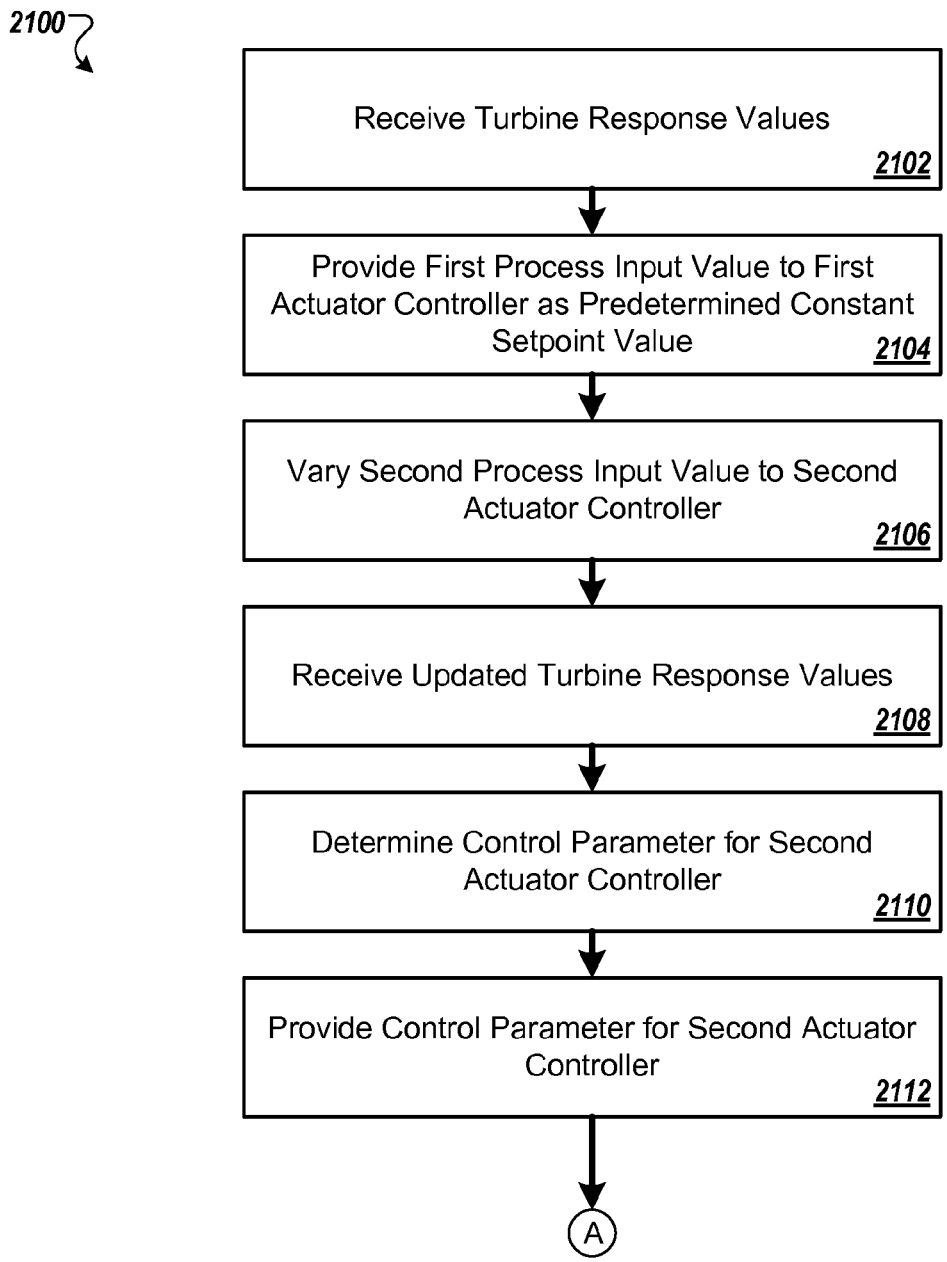
FIGS. 21A and 21B are flow diagrams of another example process for tuning multiple actuator controllers.
Figure 21B:
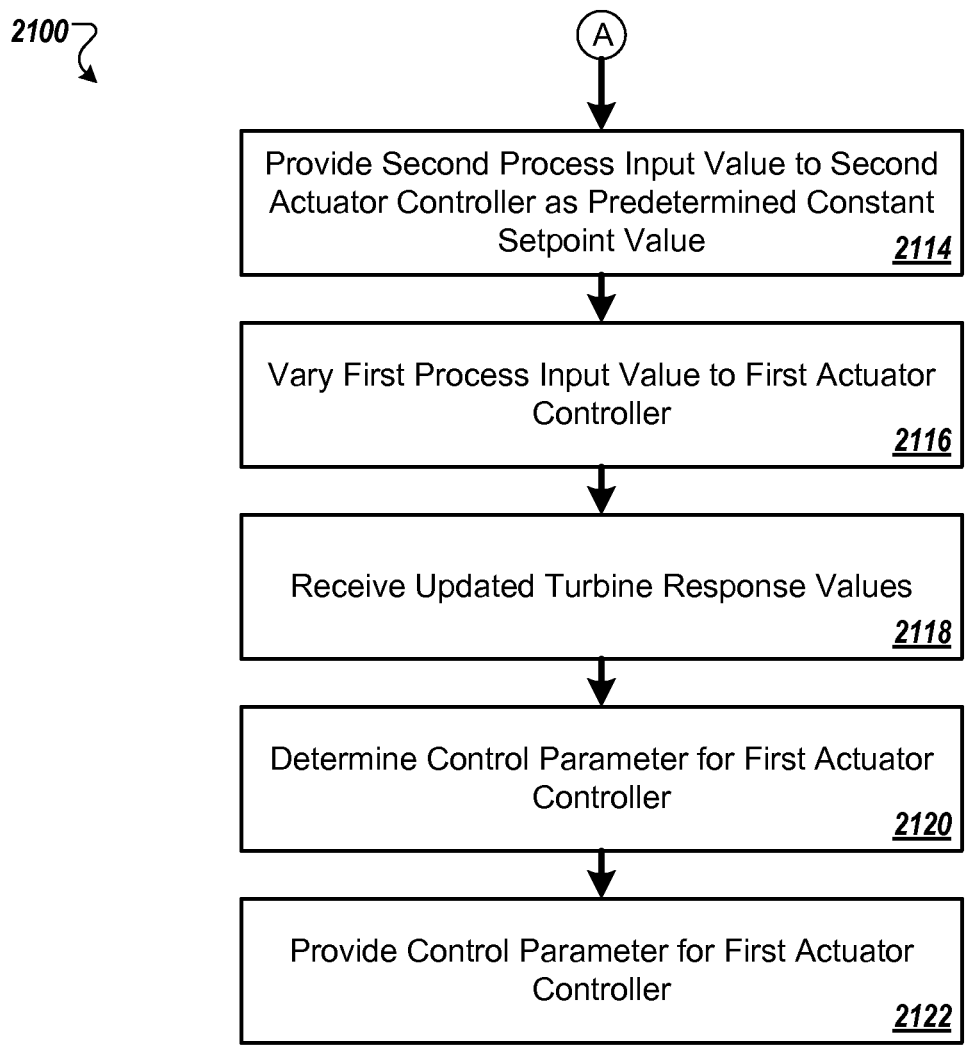

FIGS. 21A and 21B are flow diagrams of another example process 2100 for tuning multiple actuator controllers. In some implementations, the process 2100 can be used by the example turbine controller 920 to tune the example turbine system 900 of FIG. 9.

At step 2102 one or more turbine response values are received at a ratio controller. In some embodiments, the ratio controller can be the example ratio controller 1010 of FIG. 10. The turbine response values are based on a first process output value ($S_{out}$) of a first actuator controller, the first process output value being based on a first process input value ($S_{in}$) and at least one first control parameter selected from a group including a proportional gain value (P), an integral gain value (I), and a derivative gain value (SDR), wherein the first actuator controller includes a first parameter controller, and a second process output value ($P_{out}$) of a second actuator controller, the second process output value based on a second process input value ($P_{in}$) and at least one second control parameter selected from the group, wherein the second actuator controller includes a second parameter controller. For example, the first process output value can be the output of the S PID controller 1002, and the second process output value can be the output of the P PID controller 1004.

At 2104, the ratio controller provides the first actuator controller with the first process input value as a predetermined first constant set point value, and at 2106 the ratio controller varies the second process input value provided to the second actuator controller to a plurality of predetermined first set point values. For example, the set point of the S PID controller 1002 can be held constant while the set point of the P PID controller 1004 is varied through a range of set point values. In some implementations, steps 2104 and 2106 may be performed with the turbine controller 920 in the example configuration 1400 of FIG. 14.

At 2108 the second parameter controller receives one or more first updated turbine response values as the turbine response values for one or more of the first set point values. At 2110 the second parameter controller determines at least one third control parameter selected from the group based on the turbine response values, and at 2112, the second parameter controller provides the third control parameter as the second control parameter to the second actuator controller. For example, the P PID controller 1004 can determine new P, I, and/or SDR values for itself based on the example process 400 of FIG. 4. In another example, the ratio controller 1010 or another controller can determine the values based on the example process 400.

As shown in FIG. 21B, at 2114, the ratio controller provides the second actuator controller with the second process input value as a predetermined second constant set point value, and at 2116 the ratio controller varies the first process input value provided to the first actuator controller to a plurality of predetermined second set point values. For example, the set point of the P PID controller 1004 can be held constant while the set point of the S PID controller 1002 is varied through a range of set point values. In some implementations, steps 2114 and 2116 may be performed by the turbine controller 920 in the example configuration 1400 of FIG. 14.

At 2118 the first parameter controller receives one or more second updated turbine response values as the turbine response values for one or more of the second set point values. At 2120 the first parameter controller determines at least one fourth control parameter selected from the group based on the turbine response values, and at 2122, the first parameter controller provides the fourth control parameter as the first control parameter to the first actuator controller. For example, the S PID controller 1002 can determine new P, I, and/or SDR values for itself based on the example process 400 of FIG. 4. In another example, the ratio controller 1010 or another controller can determine the values based on the example process 400.

In some implementations, the process 2100 can also include controlling, by the first parameter controller and the second parameter controller, the turbine based on the first process output value and the second process output value. For example, the S PID controller 1002 and the P PID controller 1004 can control the turbine system 900 using the updated P, I, and SDR values.

In some implementations, the process 2100 can also include determining a first control output value (HP) based on the first process output value ($S_{out}$), the second process output value ($P_{out}$), and the ratio parameters ($K_x$), determining a second control output value (LP) based on the first process output value ($S_{out}$), the second process output value ($P_{out}$), and the ratio parameters (Kx), and controlling, by the ratio controller, the turbine based on the first control output value and the second control output value. In some implementations the one or more ratio parameters (Kx) can include a collection of ratio parameters $K_1$, $K_2$, $K_3$, $K_4$, $K_5$, and $K_6$, the first control output (HP) can be given by the equation HP=$K_1 S_{out}$+$K_2 P_{out}$+$K_3$, and the second control output (LP) can be given by the equation LP=$K_4 S_{out}$+$K_5 P_{out}$+$K_6$. For example, the example ratio controller 1010 of FIG. 10 can modify the output values of the PIDs 1002 and 1004 using the example scaler 1202 and the example scaler 1204 of FIG. 12 based on "K" coefficients.

In some implementations of the process 2100, the first parameter controller can control a first component of the turbine effecting the turbine response values, and the second parameter controller can control a second component of the turbine effecting the turbine response values. For example, the example S PID controller 1002 of FIG. 10 can control a LP actuator through the LP actuator input 914a, and the example P PID controller 1004 of FIG. 10 can control a HP actuator through the HP actuator input 914b to control the performance of the turbine 912.

While the preceding discussion has described systems and processes with certain quantities and types of controllers (e.g., S PID controller 1002, P PID controller 1004), input values (e.g., S and P), intermediate values (e.g., $K_x$, HP, LP), controlled parameters (e.g., speed, acceleration, pressure, flow, inlet/outlet configuration, extraction/admission, exhaust), and output values (e.g., the feedback signal 932), other quantities and types of values may be used. For example, three or more PID controllers may be used, in which the input to two of the PID controllers can be held substantially constant while the third PID controller is exercised through a range of values as part of an extension of the example process 2100 of FIGS. 21A-21B. In another example, any appropriate number of K coefficients may be used by the ratio controller 1010 to modify a collection of PID controller outputs, and/or may provide any appropriate number of scaled output values to a corresponding number of the controllable inputs 114 of FIG. 1.

FIG. 22 is a schematic diagram of an example of a generic computer system 2200. The system 2200 can be used for the operations described in association with the process 300 according to one implementation. For example, the system 2200 may be included in either or all of the parameter controller 140 of FIG. 1, the PID controller 120, the turbine controller 920 of FIG. 9, the S PID controller 1002 of FIG. 10, the P PID controller 1004, and/or the ratio controller 1010.

The system 2200 includes a processor 2210, a memory 2220, a storage device 2230, and an input/output device 2240. Each of the components 2210, 2220, 2230, and 2240 are interconnected using a system bus 2250. The processor 2210 is capable of processing instructions for execution within the system 2200. In one implementation, the processor 2210 is a single-threaded processor. In another implementation, the processor 2210 is a multi-threaded processor. The processor 2210 is capable of processing instructions stored in the memory 2220 or on the storage device 2230 to display graphical information for a user interface on the input/output device 2240.

The memory 2220 stores information within the system 2200. In one implementation, the memory 2220 is a computer-readable medium. In one implementation, the memory 2220 is a volatile memory unit. In another implementation, the memory 2220 is a non-volatile memory unit.

The storage device 2230 is capable of providing mass storage for the system 2200. In one implementation, the storage device 2230 is a computer-readable medium. In various different implementations, the storage device 2230 may be a floppy disk device, a hard disk device, an optical disk device, or a tape device.

The input/output device 2240 provides input/output operations for the system 2200. In one implementation, the input/output device 2240 includes a keyboard and/or pointing device. In another implementation, the input/output device 2240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Figure 23:
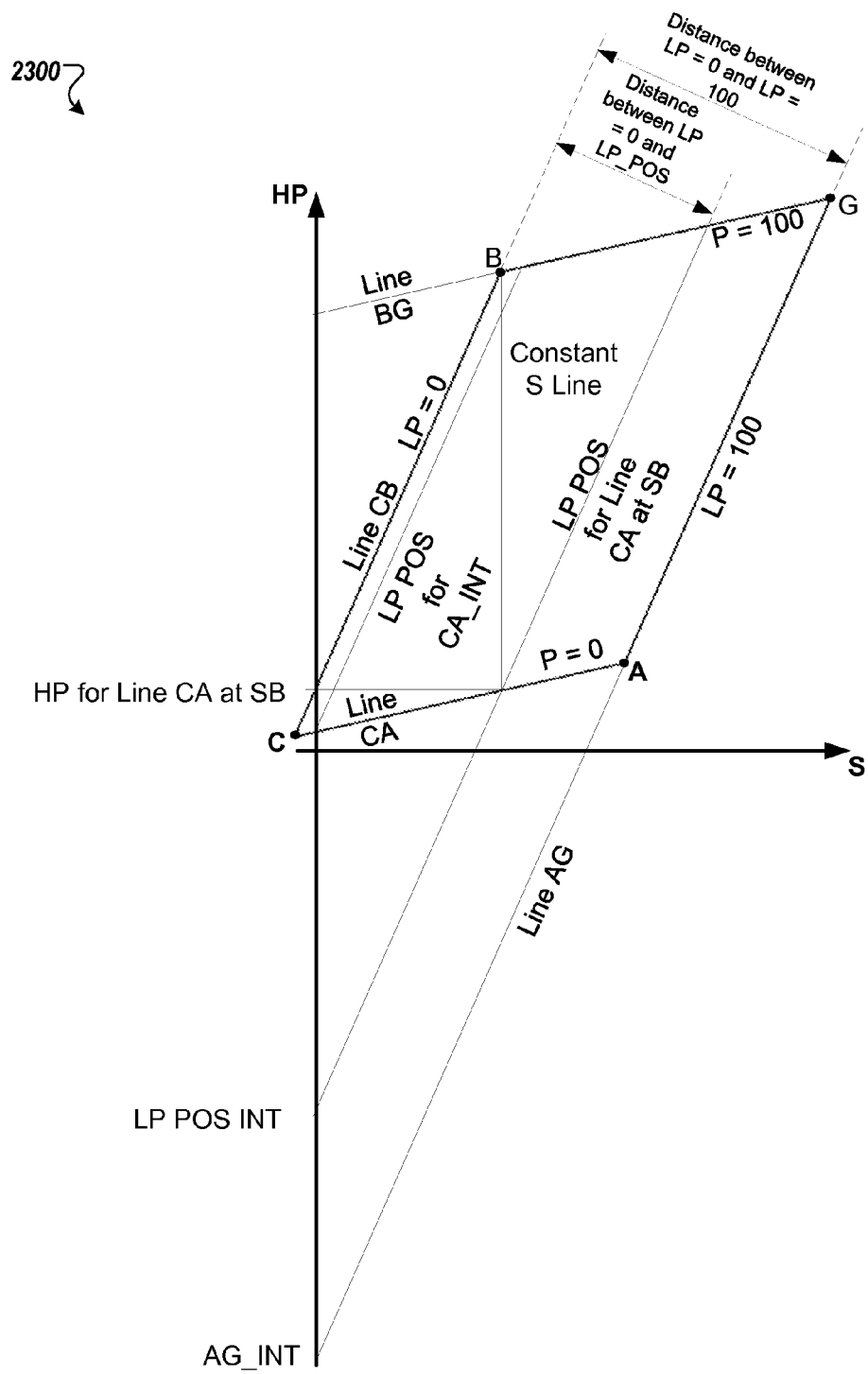
FIG. 23 is a diagram of an example steam map.

FIG. 23 is a diagram of an example steam map 2300. In some implementations, the steam map 2300 may be provided by a turbine manufacturer to describe the parameters of a turbine (e.g., the example turbine 912 of FIG. 9). In some implementations, the steam map 2300 may be determined from turbine parameter information provided by the turbine manufacturer.

The steam map 2300 includes points A, B, and C. $K_x$ coefficient values can be determined based on these three points, A, B, and C. In general terms, $K_1$ is the slope of line CA, $K_2$ can be solved as the amount of change in HP (e.g., Y-axis), from HB to the HP value for the line CA solved for an S value=SB over 100 (e.g., full P range). $K_3$ is the Y intercept of line CA. $K_4$ is the full LP range (e.g., 100) divided by the change in S from point A to point C. $K_5$ is the change in LP from point B to the point where line CA is intersected by a vertical line from point B (e.g., full P range). $K_6$ is the LP position at the Y intercept of line CA (e.g., P=0 and S=0). In some implementations, $K_6$ can be found similar to above as the ratio of two distances.

Point A can be described by (A_x, A_y), where A_x and A_y are the x and y axis values for point A. Point B can be described by (B_x, B_y), where B_x and B_y are the x and y axis values for point B. Point C can be described by (C_x, C_y), where C_x and C_y are the x and y axis values for point C. $K_x$ coefficients can be determined as:

$$K_1 = (C\_y - A\_y)/(C\_x - A\_x)$$

$$K_3 = A\_y - A\_x * K_1$$

$$K_2 = (B\_y - K_3 - K_1 * B\_x)/100$$

$$K_4 = 100/(A\_x - C\_x)$$

$$K_6 = -K_4 * C\_x$$

$$K_5 = (B\_x * K_4 + K_6)/-100$$

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for operating a turbine comprising:
   receiving, at a ratio controller of the turbine, a first process output value ($S_{out}$) of a first actuator controller, the first process output value based on a first process input value ($S_{in}$), one or more turbine response values of the turbine, and at least one first control parameter selected from a group comprising a proportional gain value, an integral gain value, and a derivative gain value;
   receiving, at the ratio controller, a second process output value ($P_{out}$) of a second actuator controller, the second process output value based on a second process input value ($P_{in}$), one or more turbine response values of the turbine, and at least one second control parameter selected from the group;
   providing, by the ratio controller and to the first actuator controller, the first process input value as a predetermined first constant set point value;
   determining, by the first actuator controller, a first process output value based on the first process input value;
   varying, by the ratio controller and to the second actuator controller, the second process input value to a plurality of predetermined first varying set point values;
   determining, by the second actuator controller, a second process output value based on the second process input value;
   operating the turbine based on the first process output value and the second process output value;
   receiving, by the second actuator controller and for one or more of the first varying set point values, one or more first updated turbine response values based on operation of the turbine;
   determining, by the second actuator controller, at least one third control parameter based on the turbine response values;
   providing, by the ratio controller and to the second actuator controller, the second process input value as a predetermined second constant set point value;
   determining, by the second actuator controller, a third process output value based on the second process input value, the turbine response values, and the third control parameter;
   varying, by the ratio controller and to the first actuator controller, the first process input value to a plurality of predetermined second varying set point values;
   determining, by the first actuator controller, a fourth process output value based on the first process input value;
   operating the turbine based on the third process output value and the fourth process output value;
   receiving, by the first actuator controller and for one or more of the second varying set point values, one or more second updated turbine response values based on operation of the turbine;
   determining, by the first actuator controller, at least one fourth control parameter based on the turbine response values; and
   operating the turbine based on the third control parameter and the fourth control parameter.

2. The method of claim 1, further comprising:
   determining a first control output value (HP) based on the first process output value ($S_{out}$), the second process output value ($P_{out}$), and one or more ratio parameters ($K_x$);
   determining a second control output value (LP) based on the first process output value ($S_{out}$), the second process output value ($P_{out}$), and the one or more ratio parameters; and
   controlling, by the ratio controller, the turbine based on the first control output value and the second control output value.

3. The method of claim 2, wherein the one or more ratio parameters ($K_x$) comprises a collection of ratio parameters $K_1$, $K_2$, $K_3$, $K_4$, $K_5$, and $K_6$, the first control output (HP) is given by the equation $HP = K_1 S_{out} + K_2 P_{out} + K_3$, and the second control output (LP) is given by the equation $LP = K_4 S_{out} + K_5 P_{out} + K_6$.

4. The method of claim 1, wherein the first actuator controller controls a first component of the turbine effecting the turbine response values, and the second actuator controller controls a second component of the turbine effecting the turbine response values.

5. A controller comprising:
   a turbine controller configured to control a turbine, the turbine controller comprising:
     an input port;
     an output port;
     a ratio controller;
     memory storing instructions that are executable; and
     one or more processing devices to execute the instructions to perform operations comprising:
       receiving, at the ratio controller, a first process output value ($S_{out}$) of a first actuator controller, the first process output value based on a first process input value ($S_{in}$), one or more turbine response values of the turbine, and at least one first control parameter selected from a group comprising a proportional gain value, an integral gain value, and a derivative gain value; and
       receiving, at the ratio controller, a second process output value ($P_{out}$) of a second actuator controller, the second process output value based on a second process input value ($P_{in}$), one or more turbine response values of the turbine, and at least one second control parameter selected from the group;
       providing, by the ratio controller and to the first actuator controller, the first process input value as a predetermined first constant set point value;
       determining, by the first actuator controller, a first process output value based on the first process input value;
       varying, by the ratio controller and to the second actuator controller, the second process input value to a plurality of predetermined first varying set point values;

determining, by the second actuator controller, a second process output value based on the second process input value;

operating the turbine based on the first process output value and the second process output value;

receiving, by the second actuator controller and for one or more of the first varying set point values, one or more first updated turbine response values based on operation of the turbine;

determining, by the second actuator controller, at least one third control parameter based on the turbine response values;

providing, by the ratio controller and to the second actuator controller, the second process input value as a predetermined second constant set point value;

determining, by the second actuator controller, a third process output value based on the second process input value, the turbine response values, and the third control parameter;

varying, by the ratio controller and to the first actuator controller, the first process input value to a plurality of predetermined second varying set point values;

determining, by the first actuator controller, a fourth process output value based on the first process input value;

operating the turbine based on the third process output value and the fourth process output value;

receiving, by the first actuator controller and for one or more of the second varying set point values, one or more second updated turbine response values based on operation of the turbine;

determining, by the first actuator controller, at least one fourth control parameter based on the turbine response values; and operating the turbine based on the third control parameter and the fourth control parameter.

6. The controller of claim 5, the operations further comprising:

determining a first control output value (HP) based on the first process output value ($S_{out}$), the second process output value ($P_{out}$), and one or more ratio parameters ($K_x$);

determining a second control output value (LP) based on the first process output value ($S_{out}$), the second process output value ($P_{out}$), and the ratio parameters; and controlling, by the ratio controller, the turbine based on the first control output value and the second control output value.

7. The controller of claim 6, wherein the one or more ratio parameters ($K_x$) comprises a collection of ratio parameters $K_1$, $K_2$, $K_3$, $K_4$, $K_5$, and $K_6$, the first control output (HP) is given by the equation $HP=K_1 S_{out}+K_2 P_{out}+K_3$, and the second control output (LP) is given by the equation $LP=K_4 S_{out}+K_5 P_{out}+K_6$.

8. The controller of claim 5, wherein the first actuator controller controls a first component of the turbine effecting the turbine response values, and the second actuator controller controls a second component of the turbine effecting the turbine response values.

9. A turbine system comprising:

a first process controller configured to perform a control algorithm based on at least one first control parameter selected from a group comprising a proportional gain value, an integral gain value, and a derivative value;

a second process controller configured to perform a control algorithm based on at least one second control parameter selected from a group comprising a proportional gain value, an integral gain value, and a derivative value;

a ratio controller configured to perform a parameter adjustment algorithm;

a turbine having assembled thereto a turbine output sensor in communication with the first process controller, the second process controller, and the ratio controller;

wherein the parameter adjustment algorithm is configured to perform operations comprising:

receiving, at the ratio controller a first process output value ($S_{out}$) of a first actuator controller, the first process output value based on a first process input value ($S_{in}$), one or more turbine response values of the turbine, and at least one first control parameter selected from a group comprising a proportional gain value, an integral gain value, and a derivative gain value; and receiving, at the ratio controller, a second process output value ($P_{out}$) of a second actuator controller, the second process output value based on a second process input value ($P_{in}$), one or more turbine response values of the turbine, and at least one second control parameter selected from the group;

providing, by the ratio controller and to the first actuator controller, the first process input value as a predetermined first constant set point value;

determining, by the first actuator controller, a first process output value based on the first process input value;

varying, by the ratio controller and to the second actuator controller, the second process input value to a plurality of predetermined first varying set point values;

determining, by the second actuator controller, a second process output value based on the second process input value;

operating the turbine based on the first process output value and the second process output value;

receiving, by the second actuator controller and for one or more of the first varying set point values, one or more first updated turbine response values based on operation of the turbine;

determining, by the second actuator controller, at least one third control parameter based on the turbine response values;

providing, by the ratio controller and to the second actuator controller, the second process input value as a predetermined second constant set point value;

determining, by the second actuator controller, a third process output value based on the second process input value, the turbine response values, and the third control parameter;

varying, by the ratio controller and to the first actuator controller, the first process input value to a plurality of predetermined second varying set point values;

determining, by the first actuator controller, a fourth process output value based on the first process input value;

operating the turbine based on the third process output value and the fourth process output value;

receiving, by the first actuator controller and for one or more of the second varying set point values, one or more second updated turbine response values based on operation of the turbine;

determining, by the first actuator controller, at least one fourth control parameter based on the turbine response values; and operating the turbine based on the third control parameter and the fourth control parameter.

10. The turbine system of claim 9, the operations further comprising:

determining a first control output value (HP) based on the first process output value ($S_{out}$), the second process output value ($P_{out}$), and one or more ratio parameters ($K_x$);

determining a second control output value (LP) based on the first process output value ($S_{out}$), the second process output value ($P_{out}$), and the ratio parameters; and controlling, by the ratio controller, the turbine based on the first control output value and the second control output value.

11. The turbine system of claim 10, wherein the one or more ratio parameters ($K_x$) comprises a collection of ratio parameters $K_1$, $K_2$, $K_3$, $K_4$, $K_5$, and $K_6$, the first control output (HP) is given by the equation $HP = K_1 S_{out} + K_2 P_{out} + K_3$, and the second control output (LP) is given by the equation $LP = K_4 S_{out} + K_5 P_{out} + K_6$.

12. The turbine system of claim 9, wherein the first actuator controller controls a first component of the turbine effecting the turbine response values, and the second actuator controller controls a second component of the turbine effecting the turbine response values.

13. A computer readable medium storing instructions that, when executed by one or more processors, cause the one or more processors to perform operations for controlling a turbine comprising:

receiving, at a ratio controller of a turbine, a first process output value ($S_{out}$) of a first actuator controller, the first process output value based on a first process input value ($S_{in}$), one or more turbine response values of the turbine, and at least one first control parameter selected from a group comprising a proportional gain value, an integral gain value, and a derivative gain value; and receiving, at the ratio controller, a second process output value ($P_{out}$) of a second actuator controller, the second process output value based on a second process input value ($P_{in}$), one or more turbine response values of the turbine and at least one second control parameter selected from the group;

providing, by the ratio controller and to the first actuator controller, the first process input value as a predetermined first constant set point value;

determining, by the first actuator controller, a first process output value based on the first process input value;

varying, by the ratio controller and to the second actuator controller, the second process input value to a plurality of predetermined first varying set point values;

determining, by the second actuator controller, a second process output value based on the second process input value;

operating the turbine based on the first process output value and the second process output value;

receiving, by the second actuator controller and for one or more of the first varying set point values, one or more first updated turbine response values based on operation of the turbine;

determining, by the second actuator controller, at least one third control parameter based on the turbine response values;

providing, by the ratio controller and to the second actuator controller, the second process input value as a predetermined second constant set point value;

determining, by the second actuator controller, a third process output value based on the second process input value, the turbine response values, and the third control parameter;

varying, by the ratio controller and to the first actuator controller, the first process input value to a plurality of predetermined second varying set point values;

determining, by the first actuator controller, a fourth process output value based on the first process input value;

operating the turbine based on the third process output value and the fourth process output value;

receiving, by the first actuator controller and for one or more of the second varying set point values, one or more second updated turbine response values based on operation of the turbine;

determining, by the first actuator controller, at least one fourth control parameter based on the turbine response values; and operating the turbine based on the third control parameter and the fourth control parameter.

14. The computer readable medium of claim 13, the operations further comprising:

determining a first control output value (HP) based on the first process output value ($S_{out}$), the second process output value ($P_{out}$), and the ratio parameters;

determining a second control output value (LP) based on the first process output value ($S_{out}$), the second process output value ($P_{out}$), and the ratio parameters; and controlling, by the ratio controller, the turbine based on the first control output value and the second control output value.

15. The computer readable medium of claim 14, wherein the one or more ratio parameters ($K_x$) comprises a collection of ratio parameters $K_1$, $K_2$, $K_3$, $K_4$, $K_5$, and $K_6$, the first control output (HP) is given by the equation $HP = K_1 S_{out} + K_2 P_{out} + K_3$, and the second control output (LP) is given by the equation $LP = K_4 S_{out} + K_5 P_{out} + K_6$.

16. The computer readable medium of claim 13, wherein the first actuator controller controls a first component of the turbine effecting the turbine response values, and the second actuator controller controls a second component of the turbine effecting the turbine response values.

* * * * *